United States Patent
Tomida et al.

(10) Patent No.: US 12,242,950 B2
(45) Date of Patent: Mar. 4, 2025

(54) NEURAL NETWORK CIRCUIT, EDGE DEVICE AND NEURAL NETWORK OPERATION PROCESS

(71) Applicant: LeapMind Inc., Tokyo (JP)

(72) Inventors: Koumei Tomida, Tokyo (JP); Nikolay Nez, Tokyo (JP)

(73) Assignee: LeapMind Inc., Tokyo (JP)

( * ) Notice: Subject to any disclaimer, the term of this patent is extended or adjusted under 35 U.S.C. 154(b) by 819 days.

(21) Appl. No.: 17/227,785

(22) Filed: Apr. 12, 2021

(65) Prior Publication Data

US 2021/0319294 A1 Oct. 14, 2021

(30) Foreign Application Priority Data

Apr. 13, 2020 (JP) ................................. 2020-071932

(51) Int. Cl.
*G06N 3/04* (2023.01)
*G06N 3/063* (2023.01)

(52) U.S. Cl.
CPC .............. *G06N 3/063* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2008/0143412 A1* | 6/2008 | Sumita | H03K 3/35625 327/200 |
| 2018/0157465 A1* | 6/2018 | Bittner | G06F 7/52 |
| 2019/0056916 A1* | 2/2019 | Varma | G06F 9/30112 |
| 2019/0057302 A1* | 2/2019 | Cho | G06N 3/063 |
| 2019/0065896 A1 | 2/2019 | Lee et al. | |

(Continued)

FOREIGN PATENT DOCUMENTS

| CN | 108364061 A | 8/2018 |
|---|---|---|
| JP | A-04-233063 | 8/1992 |

(Continued)

OTHER PUBLICATIONS

Li et al ("High-performance Convolutional Neural Network Accelerator Based on Systolic Arrays and Quantization" 2019) (Year: 2019).*

(Continued)

*Primary Examiner* — Lut Wong
(74) *Attorney, Agent, or Firm* — Dority & Manning, P.A.

(57) ABSTRACT

A neural network circuit that can be embedded in an embedded device such as an IoT device, and that provides high performance. The neural network circuit includes a first memory unit that stores input data; a convolution operation circuit that performs a convolution operation on a weight and the input data stored in the first memory unit; a second memory unit that stores convolution operation output data from the convolution operation circuit; and a quantization operation circuit that performs a quantization operation on the convolution operation output data stored in the second memory unit; wherein the first memory unit stores a quantization operation output data from the quantization operation circuit; and the convolution operation circuit performs the convolution operation on the quantization operation output data stored in the first memory unit as the input data.

5 Claims, 17 Drawing Sheets

(56) References Cited

U.S. PATENT DOCUMENTS

| | | | |
|---|---|---|---|
| 2019/0332903 A1 | 10/2019 | Nealis et al. | |
| 2019/0332925 A1* | 10/2019 | Modha | G06N 3/045 |
| 2019/0369988 A1 | 12/2019 | Kaul et al. | |
| 2020/0089965 A1* | 3/2020 | Hollander | G08B 13/19608 |

FOREIGN PATENT DOCUMENTS

| | | |
|---|---|---|
| JP | A-2016-157233 | 9/2016 |
| JP | A-2018-077829 | 5/2018 |
| JP | A-2019-139747 | 8/2019 |
| JP | A-2019-160319 | 9/2019 |
| KR | 20190098033 A | 8/2019 |
| KR | 20200019736 A | 2/2020 |
| TW | 202005312 | 1/2020 |
| WO | WO 2019/113007 A1 | 6/2019 |
| WO | WO 2019/220692 | 11/2019 |

OTHER PUBLICATIONS

Korean Office Action (w/ English translation) for corresponding KR Application No. 10-2021-0047004, mailed Jun. 26, 2023, 15 pages.
Li et al., "High-performance Convolutional Neural Network Accelerator Based on Systolic Arrays and Quantization". 2019 IEEE 4$^{th}$ International Conference on Signal and Image Processing (ICSIP). Nanjing, China, Jul. 19, 2019, pp. 335-339.
Korean Office Action (w/ English translation) for corresponding KR Application No. 10-2021-0047004, Issued Dec. 9, 2022, 19 pages.
Otsu, "Brain and Computer 2: Peripheral Neuro-computing," Baifukanco., Ltd., Nov. 30, 1994, First Edition, p. 139 (Please see English translation of Japanese Office Action dated Sep. 1, 2020, which provides a concise explanation of relevance).
Momose et al., "Deep Learning Chips and AI Computing," Artificial Intelligence, The Japanese Society for Artificial Intelligence, Jan. 1, 2018, vol. 33, No. 1, pp. 23-30 (Please see English translation of Japanese Office Action dated Feb. 9, 2021, which provides a concise explanation of relevance).
Japanese Office Action (w/ English translation) for corresponding JP Application No. 2020-071932, mailed on Sep. 1, 2020—8 pages.
Japanese Office Action (w/ English translation) for corresponding JP Application No. 2020-071932, mailed on Feb. 9, 2021—4 pages.
Taiwanese Office Action (w/ English translation of Search Report) for corresponding Patent Application No. TW 110113109, filed Apr. 12, 2021, 11 pages.
Chinese Office Action (w/ English translation) for corresponding Application No. 202110388524.2, dated Aug. 24, 2024, 15 pages.

* cited by examiner

NEURAL NETWORK CIRCUIT, EDGE DEVICE AND NEURAL NETWORK OPERATION PROCESS

The present application claims priority on Japanese Patent Application No. 2020-071932 (filed on Apr. 13, 2020). All of the contents of the above application are incorporated herein by reference.

BACKGROUND OF THE INVENTION

Field of the Invention

The present invention relates to a neural network circuit, an edge device and a neural network operation process.

Description of Related Art

In recent years, convolutional neural networks (CNN) have been used as models for image recognition and the like. Convolutional neural networks have a multilayered structure with convolutional layers and pooling layers, and require many operations such as convolution operations. Various operation processes that accelerate operations by convolutional neural networks have been proposed (e.g., Japanese Unexamined Patent Application, First Publication No. 2018-077829 A).

SUMMARY OF THE INVENTION

Meanwhile, there is a demand to implement image recognition and the like by utilizing convolutional neural networks in embedded devices such as IoT devices. Large-scale dedicated circuits as described in Japanese Unexamined Patent Application, First Publication No. 2018-077829 A are difficult to embed in embedded devices. Additionally, in embedded devices with limited hardware resources such as CPU or memory, sufficient operational performance is difficult to realize in convolutional neural networks by means of software alone.

The neural network circuit according to a first embodiment of the present invention includes a first memory unit that stores input data; a convolution operation circuit that performs a convolution operation on a weight and the input data stored in the first memory unit; a second memory unit that stores convolution operation output data from the convolution operation circuit; and a quantization operation circuit that performs a quantization operation on the convolution operation output data stored in the second memory unit; wherein the first memory unit stores a quantization operation output data from the quantization operation circuit; and the convolution operation circuit performs the convolution operation on the quantization operation output data stored in the first memory unit as the input data.

The neural network operation process according to a second embodiment of the present invention is a neural network operation process in which a first memory area and a second memory area are used to perform a convolution operation and a quantization operation, wherein the neural network operation process includes performing a layer-(2M−1) convolution operation, where M is a natural number, on input data stored in the first memory area, and storing the layer-(2M−1) convolution operation output data in the second memory area; performing a layer-2M quantization operation on the layer-(2M−1) convolution operation output data stored in the second memory area, and storing the layer-2M quantization operation output data in the first memory area; and performing a layer-(2M+1) convolution operation with the layer-2M quantization operation output data stored in the first memory area as the input data, and storing the layer-(2M+1) convolution operation output data in the second memory area.

DETAILED DESCRIPTION OF THE INVENTION

First Embodiment

The first embodiment of the present invention will be explained with reference to FIG. 1 to FIG. 20.

Figure 1:
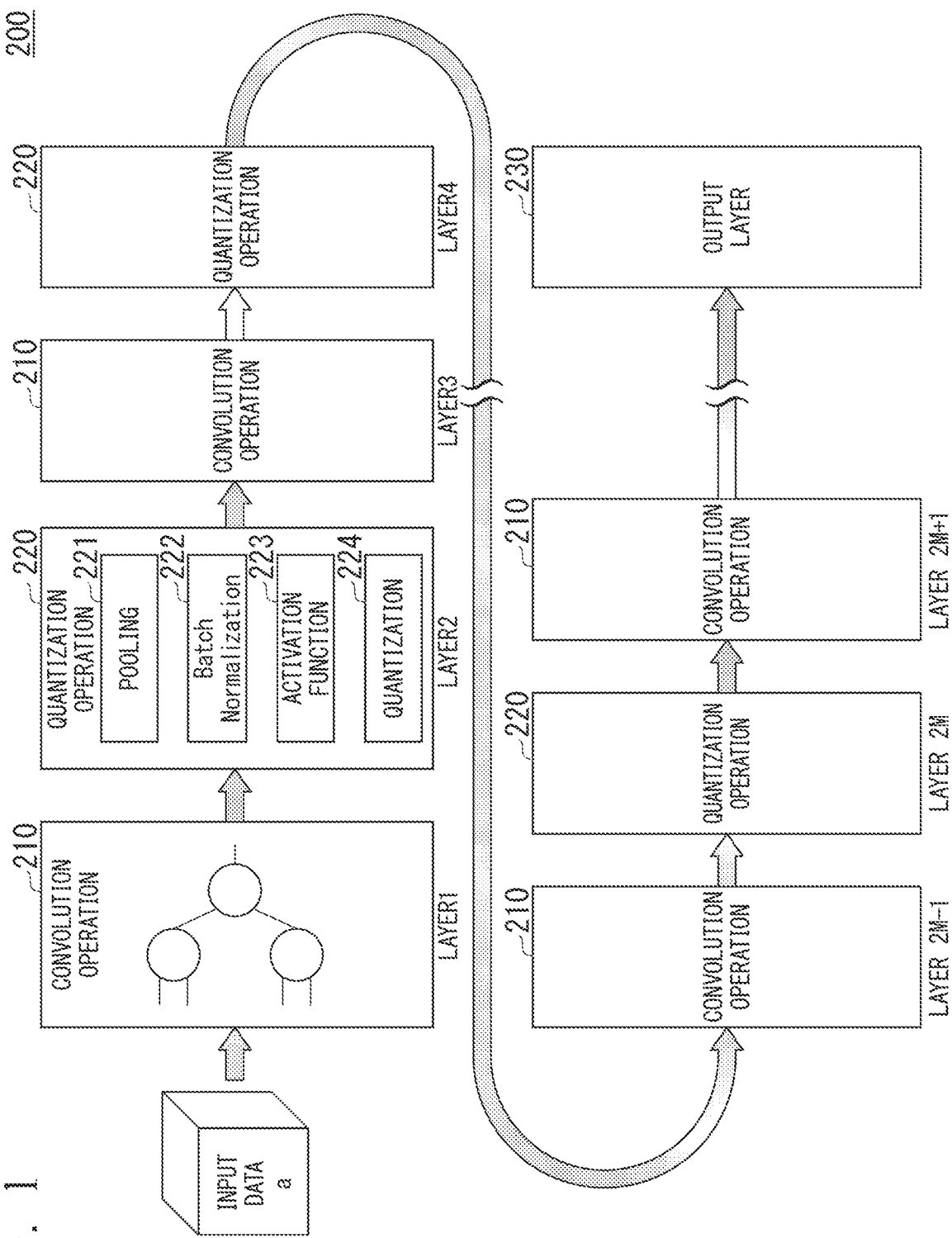
FIG. 1 is a diagram illustrating a convolutional neural network.

FIG. 1 is a diagram illustrating a convolutional neural network 200 (hereinafter referred to as "CNN 200"). The operations performed by the neural network circuit 100 (hereinafter referred to as "NN circuit 100") according to the first embodiment constitute at least part of a trained CNN 200, which is used at the time of inference.

The CNN 200 is a network having a multilayered structure, including convolution layers 210 that perform convolution operations, quantization operation layers 220 that perform quantization operations, and an output layer 230. In at least part of the CNN 200, the convolution layers 210 and the quantization operation layers 200 are connected in an alternating manner. The CNN 200 is a model that is widely used for image recognition and video recognition. The CNN 200 may further have a layer with another function, such as a fully connected layer.

Figure 2:
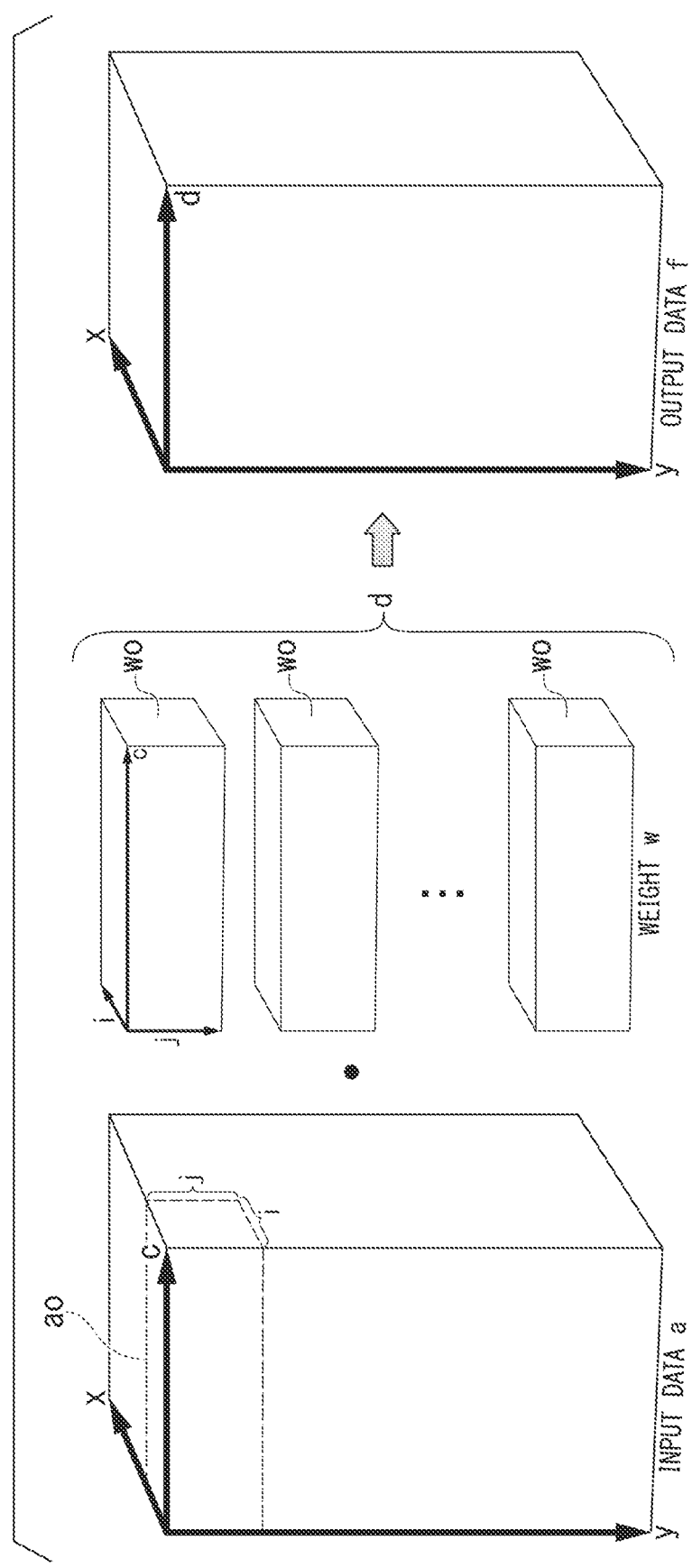
FIG. 2 is a diagram for explaining a convolution operation performed by a convolution layer.

FIG. 2 is a diagram explaining the convolution operations performed by the convolution layers 210.

The convolution layers 210 perform convolution operations in which weights w are used on input data a. When the input data a and the weights w are input, the convolution layers 210 perform multiply-add operations.

The input data a (also referred to as activation data or a feature map) that is input to the convolution layers 210 is multi-dimensional data such as image data. In the present embodiment, the input data a is a three-dimensional tensor comprising elements (x, y, c). The convolution layers 210 in the CNN 200 perform convolution operations on low-bit input data a. In the present embodiment, the elements of the input data a are 2-bit unsigned integers (0, 1, 2, 3). The elements of the input data a may, for example, be 4-bit or 8-bit unsigned integers.

If the input data that is input to the CNN 200 is of a type different from that of the input data a input to the convolution layers 210, e.g., of the 32-bit floating-point type, then the CNN 200 may further have an input layer for performing type conversion or quantization in front of the convolution layers 210.

The weights w (also referred to as filters or kernels) in the convolution layers 210 are multi-dimensional data having elements that are learnable parameters. In the present embodiment, the weights w are four-dimensional tensors comprising the elements (i,j, c, d). The weights w include d three-dimensional tensors (hereinafter referred to as "weights wo") having the elements (i,j, c). The weights w in a trained CNN 200 are learned data. The convolution layers 210 in the CNN 200 use low-bit weights w to perform convolution operations. In the present embodiment, the elements of the weights w are 1-bit signed integers (0, 1), where the value "0" represents +1 and the value "1" represents −1.

The convolution layers 210 perform the convolution operation indicated in Equation 1 and output the output data f. In Equation 1, s indicates a stride. The region indicated by the dotted line in FIG. 2 indicates one region ao (hereinafter referred to as "application region ao") in which the weights wo are applied to the input data a. The elements of the application region ao can be represented by (x +i, y +j, c).

$$f(x, y, d) = \Sigma_i^K \Sigma_j^K \Sigma_c^C a(s \cdot x+i, s \cdot y, c) \cdot w(i, j, c, d) \quad \text{Equation 1:}$$

The quantization operation layers 220 implement quantization or the like on the convolution operation outputs that are output by the convolution layers 210. The quantization operation layers 220 each have a pooling layer 221, a batch normalization layer 222, an activation function layer 223, and a quantization layer 224.

The pooling layer 221 implements operations such as average pooling (Equation 2) and max pooling (Equation 3) on the convolution operation output data f output by a convolution layer 210, thereby compressing the output data f from the convolution layer 210. In Equation 2 and Equation 3, u indicates an input tensor, v indicates an output tensor, and T indicates the size of a pooling region. In Equation 3, max is a function that outputs the maximum value of u for combinations of i and j contained in T.

$$v(x, y, c) = \frac{1}{T^2} \sum_i^T \sum_j^T u(T \cdot x + i, T \cdot y + j, c) \quad \text{Equation 2}$$

$$v(x, y, c) = \max(u(T \cdot x + i, T \cdot y + j, c)), i \in T, j \in T \quad \text{Equation 3}$$

The batch normalization layer 222 normalizes the data distribution of the output data from a quantization operation layer 220 or a pooling layer 221 by means of an operation as indicated, for example, by Equation 4. In Equation 4, u indicates an input tensor, v indicates on output tensor, a indicates a scale, and β indicates a bias. In a trained CNN 200, α and β are learned constant vectors.

$$v(x, y, c) = \alpha(c) \cdot (u(x, y, c) - \beta(c)) \quad \text{Equation 4:}$$

The activation function layer 223 performs activation function operations such as ReLU (Equation 5) on the output from a quantization operation layer 220, a pooling layer 221, or a batch normalization layer 222. In Equation 5, u is an input tensor and v is an output tensor. In Equation 5, max is a function that outputs the argument having the highest numerical value.

$$v(x, y, c) = \max(0, u(x, y, c)) \quad \text{Equation 5:}$$

The quantization layer 224 performs quantization as indicated, for example, by Equation 6, on the outputs from a pooling layer 221 or an activation function layer 223, based on quantization parameters. The quantization indicated by Equation 6 reduces the bits in an input tensor u to two bits. In Equation 6, q(c) is a quantization parameter vector. In a trained CNN 200, q(c) is a trained constant vector. In Equation 6, the inequality sign "≤" may be replaced with "<".

$$qtz(x, y, c) = 0 \text{ if } u(x, y, c) \leq q(c) \cdot th0 \text{ else } 1 \text{if } u(x, y, c) \leq q(c) \cdot th1 \text{ else } 2 \text{if } u(x, y, c) \leq q(c) \cdot th2 \text{ else } 3 \quad \text{Equation 6;}$$

The output layer 230 is a layer that outputs the results of the CNN 200 by means of an identity function, a softmax function or the like. The layer preceding the output layer 230 may be either a convolution layer 210 or a quantization operation layer 220.

In the CNN 200, quantized output data from the quantization layers 224 are input to the convolution layers 210. Thus, the load of the convolution operations by the convolution layers 210 is smaller than that in other convolutional neural networks in which quantization is not performed.

[Partitioning of Convolution operations]

The NN circuit 100 performs operations by partitioning the input data to the convolution operations (Equation 1) in the convolution layers 210 into partial tensors. The partitioning method and the number of partitions of the partial tensors are not particularly limited. The partial tensors are formed, for example, by partitioning the input data a(x+i, y+j, c) into a(x+i, y+j, co). The NN circuit 100 can also perform operations on the input data to the convolution operations (Equation 1) in the convolution layers 210 without partitioning the input data.

When the input data to a convolution operation is partitioned, the variable c in Equation 1 is partitioned into blocks of size Bc, as indicated by Equation 7. Additionally, the variable d in Equation 1 is partitioned into blocks of size Bd, as indicated by Equation 8. In Equation 7, co is an offset, and ci is an index from 0 to (Bc−1). In Equation 8, do is an offset, and di is an index from 0 to (Bd−1). The size Bc and the size Bd may be the same.

$$c = co \cdot Bc + ci \quad \text{Equation 7:}$$

$$d = do \cdot Bd + ci \quad \text{Equation 8:}$$

The input data a(x+i, y+j, c) in Equation 1 is partitioned into the size Bc in the c-axis direction and is represented as the partitioned input data a(x+i, y+j, co). In the explanation below, input data a that has been partitioned is also referred to as "partitioned input data a".

The weight w(i, j, c, d) in Equation 1 is partitioned into the size Bc in the c-axis direction and into the size Bd in the d-axis direction, and is represented as the partitioned weightw(i,j, co, do). In the explanation below, a weight w that has been partitioned will also referred to as a "partitioned weight w".

The output data j(x, y, do) partitioned into the size Bd is determined by Equation 9. The final output data j(x, y, d) can be computed by combining the partitioned output data j(x, y, do).

$$f(x, y, do) = \Sigma_i^K \Sigma_j^K \Sigma_{co}^{C/Bc} a(s \cdot x+i, s \cdot y+j, co) \cdot w(i, j, co, do)$$ Equation 9:

[Expansion of Convolution Operation Data]

The NN circuit 100 performs convolution operations by expanding the input data a and the weights w in the convolution operations by the convolution layers 210.

Figure 3:
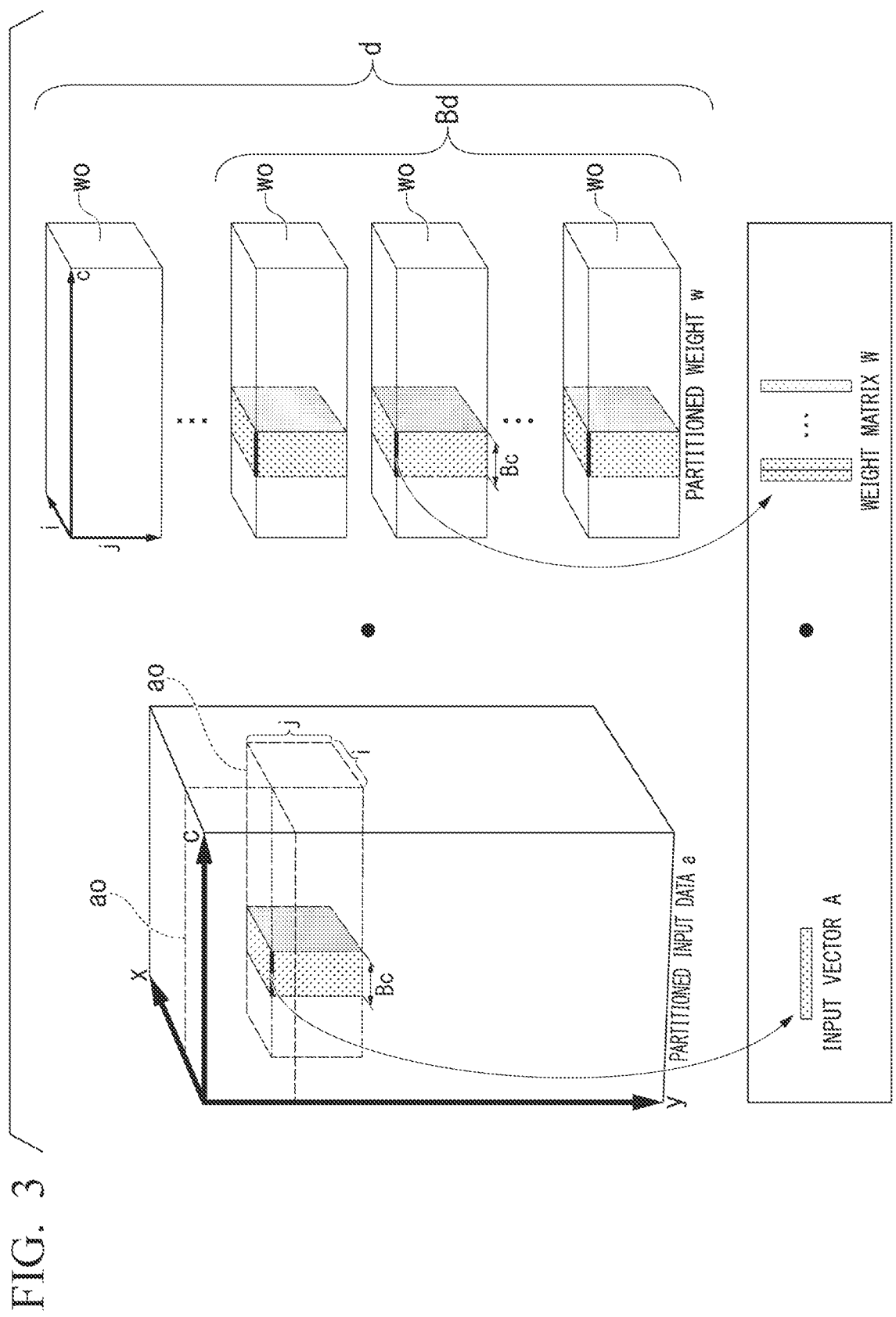
FIG. 3 is a diagram for explaining data expansion in a convolution operation.

FIG. 3 is a diagram explaining the expansion of the convolution operation data.

The partitioned input data a(x+i, y+j, co) is expanded into vector data having Bc elements. The elements in the partitioned input data a are indexed by ci (where $0 \leq ci < Bc$). In the explanation below, partitioned input data a expanded into vector data for each of i and j will also be referred to as "input vector A". An input vector A has elements from partitioned input data a(x+i, y+j, co×Bc) to partitioned input data a(x+i, y+j, co×Bc+(Bc−1)).

The partitioned weights w(i, j, co, do) are expanded into matrix data having Bc ×Bd elements. The elements of the partitioned weights w expanded into matrix data are indexed by ci and di (where $0 \leq di < Bd$). In the explanation below, a partitioned weight w expanded into matrix data for each of i and j will also be referred to as a "weight matrix W". A weight matrix W has elements from a partitioned weight w(i, j, co×Bc, do ×Bd) to a partitioned weight w(i,j, co×Bc+(Bc−1), do×Bd+(Bd−1)).

Vector data is computed by multiplying an input vector A with a weight matrix W. Output data f(x, y, do) can be obtained by formatting vector data computed for each of i, j, and co as a three-dimensional tensor. By expanding data in this manner, the convolution operations in the convolution layers 210 can be implemented by multiplying vector data with matrix data.

[NN Circuit 100]

Figure 4:
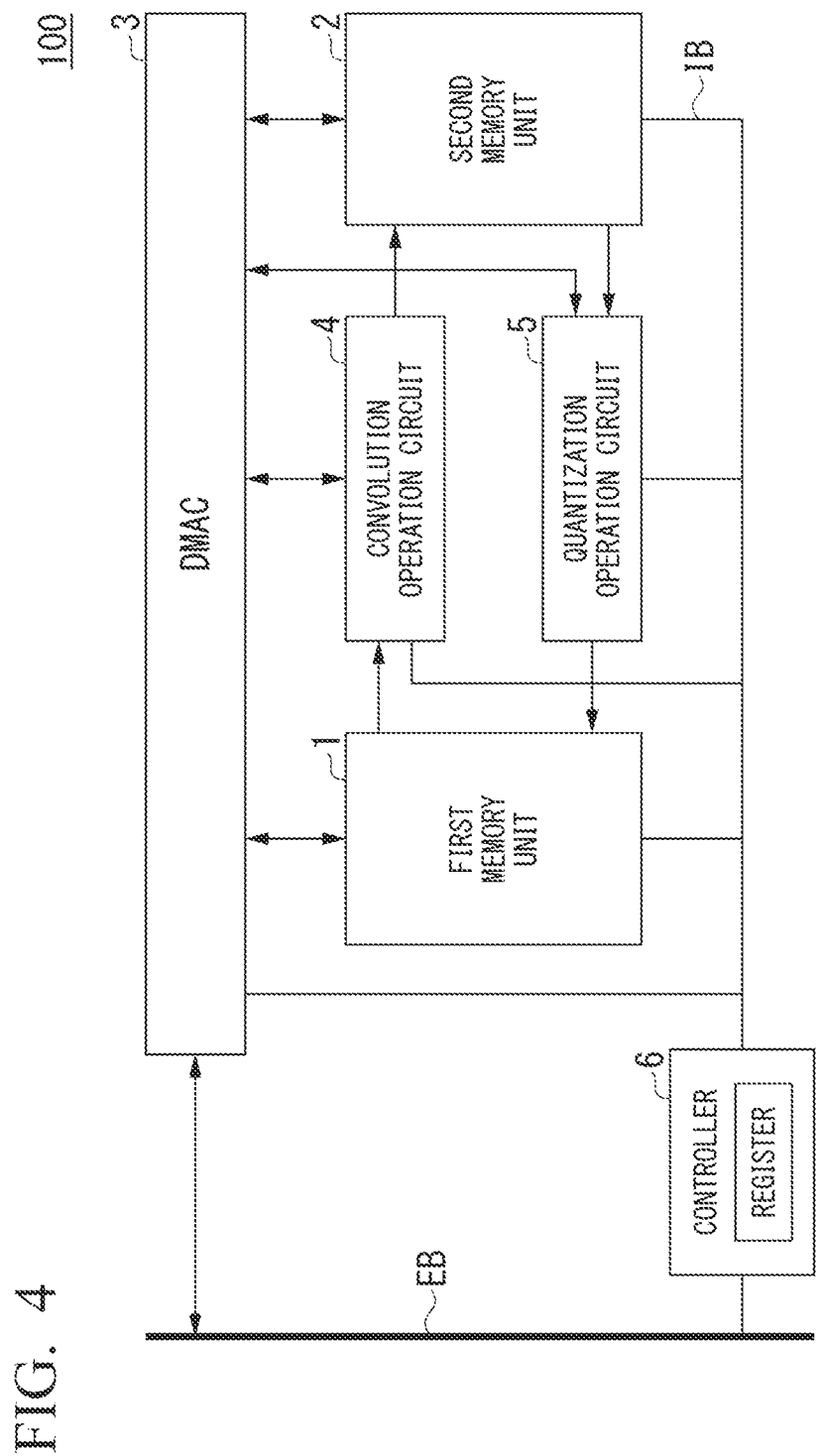
FIG. 4 is a diagram illustrating the overall structure of a neural network circuit according to a first embodiment.

FIG. 4 is a diagram illustrating the overall structure of the NN circuit 100 according to the present embodiment.

The NN circuit 100 is provided with a first memory unit 1, a second memory unit 2, a DMA controller 3 (hereinafter also referred to as "DMAC 3"), a convolution operation circuit 4, a quantization operation circuit 5, and a controller 6. The NN circuit 100 is characterized in that the convolution operation circuit 4 and the quantization operation circuit 5 form a loop with the first memory unit 1 and the second memory unit 2 therebetween.

The first memory unit 1 is a rewritable memory unit such as a volatile memory unit composed, for example, of SRAM (Static RAM) or the like. Data is written into and read from the first memory unit 1 via the DMAC 3 and the controller 6. The first memory unit 1 is connected to an input port of the convolution operation circuit 4, and the convolution operation circuit 4 can read data from the first memory unit 1. Additionally, the first memory unit 1 is connected to an output port of the quantization operation circuit 5, and the quantization operation circuit 5 can write data into the first memory unit 1. An external host CPU can input and output data with respect to the NN circuit 100 by writing and reading data with respect to the first memory unit 1.

The second memory unit 2 is a rewritable memory unit such as a volatile memory unit composed, for example, of SRAM (Static RAM) or the like. Data is written into and read from the second memory unit 2 via the DMAC 3 and the controller 6. The second memory unit 2 is connected to an input port of the quantization operation circuit 5, and the quantization operation circuit 5 can read data from the second memory unit 2. Additionally, the second memory unit 2 is connected to an output port of the convolution operation circuit 4, and the convolution operation circuit 4 can write data into the second memory unit 2. An external host CPU can input and output data with respect to the NN circuit 100 by writing and reading data with respect to the second memory unit 2.

The DMAC 3 is connected to an external bus EB and transfers data between an external memory unit, such as DRAM, and the first memory unit 1. Additionally, the DMAC 3 transfers data between an external memory unit, such as DRAM, and the second memory unit 2. Additionally, the DMAC 3 transfers data between an external memory unit, such as DRAM, and the convolution operation circuit 4. Additionally, the DMAC 3 transfers data between an external memory unit, such as DRAM, and the quantization operation circuit 5.

The convolution operation circuit 4 is a circuit that performs a convolution operation in a convolution layer 210 in the trained CNN 200. The convolution operation circuit 4 reads input data a stored in the first memory unit 1 and implements a convolution operation on the input data a. The convolution operation circuit 4 writes output dataf(hereinafter also referred to as "convolution operation output data") from the convolution operation into the second memory unit 2.

The quantization operation circuit 5 is a circuit that performs at least part of a quantization operation in a quantization operation layer 220 in the trained CNN 200. The quantization operation circuit 5 reads the output data f from the convolution operation stored in the second memory unit 2, and performs a quantization operation (among pooling, batch normalization, an activation function, and quantization, the operation including at least quantization) on the output data f from the convolution operation. The quantization operation circuit 5 writes the output data (hereinafter referred to as "quantization operation output data") from the quantization operation into the first memory unit 1.

The controller 6 is connected to the external bus EB and operates as a slave to an external host CPU. The controller 6 has a register 61 including a parameter register and a state register. The parameter register is a register for controlling the operation of the NN circuit 100. The state register is a register indicating the state of the NN circuit 100 and including semaphores S. The external host CPU can access the register 61 via the controller 6.

The controller 6 is connected, via an internal bus IB, to the first memory unit 1, the second memory unit 2, the DMAC 3, the convolution operation circuit 4, and the quantization operation circuit 5. The external host CPU can access each block via the controller 6. For example, the external host CPU can issue commands to the DMAC 3, the convolution operation circuit 4, and the quantization operation circuit 5 via the controller 6. Additionally, the DMAC 3, the convolution operation circuit 4, and the quantization operation circuit 5 can update the state register (including the semaphores S) in the controller 6 via the internal bus IB. The state register (including the semaphores S) may be configured to be updated via dedicated wiring connected to the DMAC 3, the convolution operation circuit 4, or the quantization operation circuit 5.

Since the NN circuit 100 has a first memory unit 1, a second memory unit 2, and the like, the number of data transfers of redundant data can be reduced in data transfer by the DMAC 3 from external memory units such as DRAM. As a result thereof, the power consumption due to memory access can be largely reduced.

OPERATIONAL EXAMPLE 1 OF NN CIRCUIT of NN CIRCUIT 100

Figure 5:
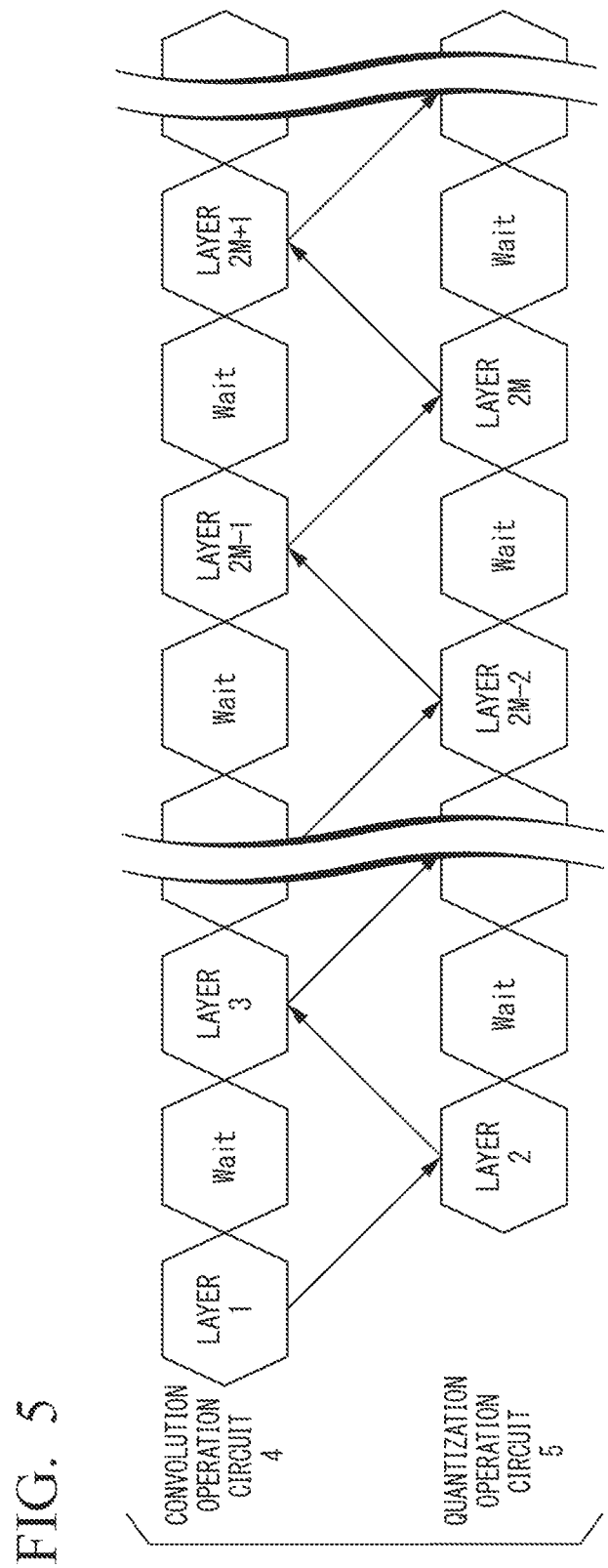
FIG. 5 is a timing chart indicating an operational example of the neural network circuit.

FIG. 5 is a timing chart indicating an operational example of the NN circuit 100.

The DMAC 3 stores layer-1 input data a in a first memory unit 1. The DMAC 3 may transfer the layer-1 input data a to the first memory unit 1 in a partitioned manner, in accordance with the sequence of convolution operations performed by the convolution operation circuit 4.

The convolution operation circuit 4 reads the layer-1 input data a stored in the first memory unit 1. The convolution operation circuit 4 performs the layer-1 convolution operation illustrated in FIG. 1 on the layer-1 input data a. The output data f from the layer-1 convolution operation is stored in the second memory unit 2.

The quantization operation circuit 5 reads the layer-1 output data f stored in the second memory unit 2. The quantization operation circuit 5 performs a layer-2 quantization operation on the layer-1 output data f. The output data from the layer-2 quantization operation is stored in the first memory unit 1.

The convolution operation circuit 4 reads the layer-2 quantization operation output data stored in the first memory unit 1. The convolution operation circuit 4 performs a layer-3 convolution operation using the output data from the layer-2 quantization operation as the input data a. The output data f from the layer-3 convolution operation is stored in the second memory unit 2.

The convolution operation circuit 4 reads layer-(2M−2) (M being a natural number) quantization operation output data stored in the first memory unit 1. The convolution operation circuit 4 performs a layer-(2M −1) convolution operation with the output data from the layer-(2M−2) quantization operation as the input data a. The output data f from the layer-(2M−1) convolution operation is stored in the second memory unit 2.

The quantization operation circuit 5 reads the layer-(2M−1) output data f stored in the second memory unit 2. The quantization operation circuit 5 performs a layer-2M quantization operation on the layer-(2M−1) output data f. The output data from the layer-2M quantization operation is stored in the first memory unit 1.

The convolution operation circuit 4 reads the layer-2M quantization operation output data stored in the first memory unit 1. The convolution operation circuit 4 performs a layer-(2M+1) convolution operation with the layer-2M quantization operation output data as the input data a. The output data f from the layer-(2M+1) convolution operation is stored in the second memory unit 2.

The convolution operation circuit 4 and the quantization operation circuit 5 perform operations in an alternating manner, thereby carrying out the operations of the CNN 200 indicated in FIG. 1. In the NN circuit 100, the convolution operation circuit 4 implements the layer-(2M−1) convolution operations and the layer-(2M+1) convolution operations in a time-divided manner. Additionally, in the NN circuit 100, the quantization operation circuit 5 implements the layer-(2M −2) quantization operations and the layer-2M quantization operations in a time-divided manner. Therefore, in the NN circuit 100, the circuit size is extremely small in comparison to the case in which a convolution operation circuit 4 and a quantization operation circuit 5 are installed separately for each layer.

In the NN circuit 100, the operations of the CNN 200, which has a multilayered structure with multiple layers, are performed by circuits that form a loop. The NN circuit 100 can efficiently utilize hardware resources due to the looped circuit configuration. Since the NN circuit 100 has circuits forming a loop, the parameters in the convolution operation circuit 4 and the quantization operation circuit 5, which change in each layer, are appropriately updated.

If the operations in the CNN 200 include operations that cannot be implemented by the NN circuit 100, then the NN circuit 100 transfers intermediate data to an external operation device such as an external host CPU. After the external operation device has performed the operations on the intermediate data, the operation results from the external operation device are input to the first memory unit 1 and the second memory unit 2. The NN circuit 100 resumes operations on the operation results from the external operation device.

OPERATIONAL EXAMPLE 2 OF NN CIRCUIT 100

Figure 6:
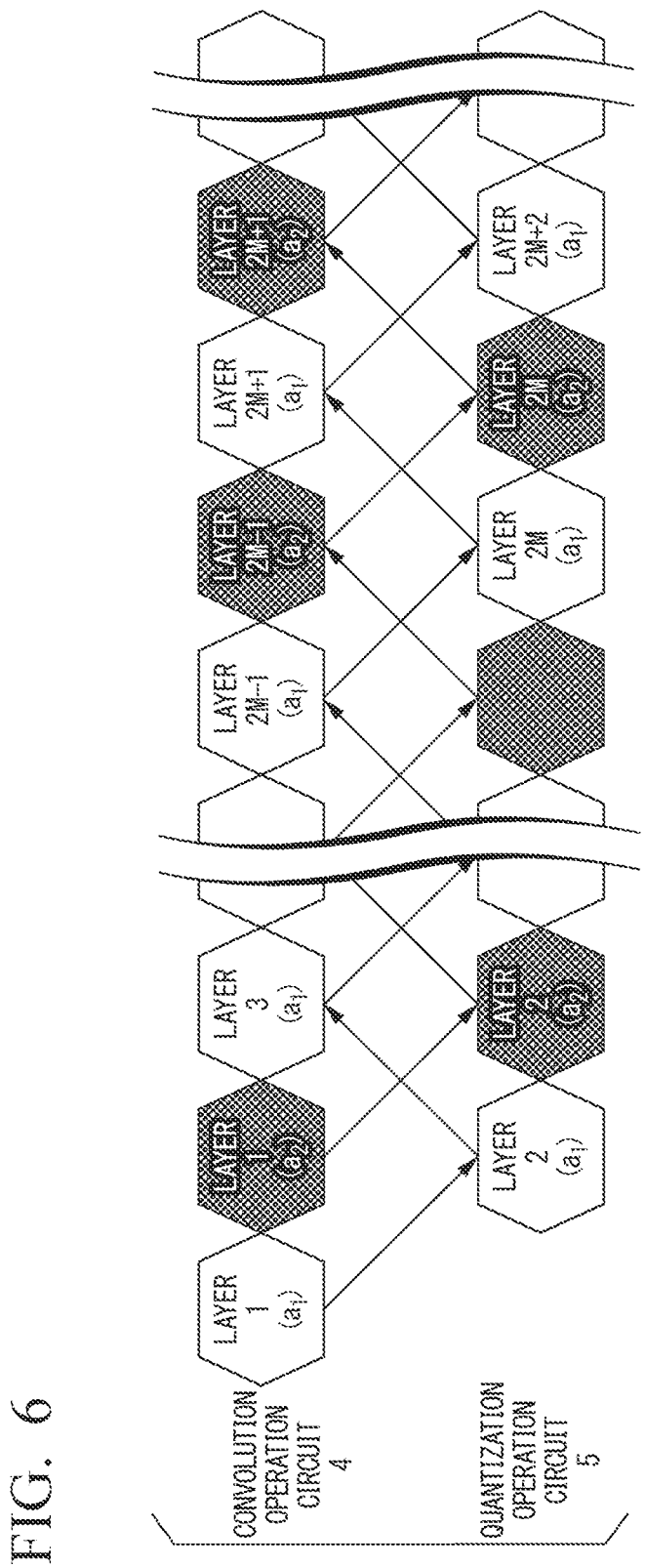
FIG. 6 is a timing chart indicating another operational example of the neural network circuit.

FIG. 6 is a timing chart illustrating another operational example of the NN circuit 100.

The NN circuit 100 may partition the input data a into partial tensors, and may perform operations on the partial tensors in a time-divided manner. The partitioning method and the number of partitions of the partial tensors are not particularly limited.

FIG. 6 shows an operational example for the case in which the input data a is decomposed into two partial tensors. The decomposed partial tensors are referred to as "first partial tensor $a_1$" and "second partial tensor $a_2$". For example, the layer-(2M−1) convolution operation is decomposed into a convolution operation corresponding to the first partial tensor $a_1$ (in FIG. 6, indicated by "Layer 2M−1 ($a_1$)") and a convolution operation corresponding to the second partial tensor $a_2$ (in FIG. 6, indicated by "Layer 2M−1 ($a_2$)").

The convolution operations and the quantization operations corresponding to the first partial tensor $a_1$ can be implemented independent of the convolution operations and the quantization operations corresponding to the second partial tensor $a_2$, as illustrated in FIG. 6.

The convolution operation circuit 4 performs a layer-(2M−1) convolution operation corresponding to the first partial tensor $a_1$ (in FIG. 6, the operation indicated by layer 2M−1 ($a_1$)). Thereafter, the convolution operation circuit 4 performs a layer-(2M−1) convolution operation corresponding to the second partial tensor $a_2$ (in FIG. 6, the operation indicated by layer 2M−1 ($a_2$)). Additionally, the quantization operation circuit 5 performs a layer-2M quantization operation corresponding to the first partial tensor $a_1$ (in FIG. 6, the operation indicated by layer 2M ($a_1$)). Thus, the NN circuit 100 can implement the layer-(2M−1) convolution operation corresponding to the second partial tensor $a_2$ and the layer-2M quantization operation corresponding to the first partial tensor $a_1$ in parallel.

Next, the convolution operation circuit 4 performs a layer-(2M+1) convolution operation corresponding to the first partial tensor $a_1$ (in FIG. 6, the operation indicated by layer 2M+1 ($a_1$)). Additionally, the quantization operation circuit 5 performs a layer-2M quantization operation corresponding to the second partial tensor $a_2$ (in FIG. 6, the operation indicated by layer 2M ($a_2$)). Thus, the NN circuit 100 can implement the layer-(2M+1) convolution operation corresponding to the first partial tensor $a_1$ and the layer-2M quantization operation corresponding to the second partial tensor $a_2$ in parallel.

The convolution operations and the quantization operations corresponding to the first partial tensor $a_1$ can be implemented independent of the convolution operations and the quantization operations corresponding to the second partial tensor $a_2$. For this reason, the NN circuit 100 may, for example, implement the layer-(2M−1) convolution operation corresponding to the first partial tensor $a_1$ and the layer-(2M+2) quantization operation corresponding to the second partial tensor $a_2$ in parallel. In other words, the convolution operations and the quantization operations that are performed in parallel by the NN circuit 100 are not limited to being operations in consecutive layers.

By partitioning the input data a into partial tensors, the NN circuit 100 can make the convolution operation circuit 4 and the quantization operation circuit 5 operate in parallel. As a result thereof, the time during which the convolution operation circuit 4 and the quantization operation circuit 5 are idle can be reduced, thereby increasing the operation processing efficiency of the NN circuit 100. Although the number of partitions in the operational example indicated in FIG. 6 was two, the NN circuit 100 can similarly make the convolution operation circuit 4 and the quantization operation circuit 5 operate in parallel even in cases in which the number of partitions is greater than two.

For example, in the case in which the input data a is partitioned into a "first partial tensor $a_1$", a "second partial tensor $a_2$", and a "third partial tensor as", the NN circuit 100 can implement the layer-(2M−1) convolution operation corresponding to the second partial tensor $a_2$ and the layer-2M quantization operation corresponding to the third partial tensor $a_2$ in parallel. The sequence of operations can be appropriately changed in accordance with the storage status of the input data a in the first memory unit 1 and the second memory unit 2.

Regarding the operation process for the partial tensors, an example in which partial tensor operations in the same layer are performed by the convolution operation circuit 4 or the quantization operation circuit 5, then followed by partial tensor operations in the next layer (process 1) was described. For example, as indicated in FIG. 6, in the convolution operation circuit 4, after the layer-(2M−1) convolution operations corresponding to the first partial tensor $a_1$ and the second partial tensor $a_2$ (in FIG. 6, the operations indicated by layer 2M−1 ($a_1$) and layer 2M−1 ($a_2$)) are performed, the layer-(2M+1) convolution operations corresponding to the first partial tensor $a_1$ and the second partial tensor $a_2$ (in FIG. 6, the operations indicated by layer 2M+1 ($a_1$) and layer 2M+1 ($a_2$)) are implemented.

However, the operation process for the partial tensors is not limited thereto. The operation process for the partial tensors may be a process wherein operations on some of the partial tensors in multiple layers are followed by implementation of operations on the remaining partial tensors (process 2). For example, in the convolution operation circuit 4, after the layer-(2M−1) convolution operations corresponding to the first partial tensor $a_1$ and the layer-(2M+1) convolution operations corresponding to the first partial tensor $a_1$ are performed, the layer-(2M−1) convolution operations corresponding to the second partial tensor $a_2$ and the layer-(2M+1) convolution operations corresponding to the second partial tensor $a_2$ may be implemented.

Additionally, the operation process for the partial tensors may be a process that involves performing operations on the partial tensors by combining process 1 and process 2. However, in the case in which process 2 is used, the operations must be implemented in accordance with a dependence relationship relating to the operation sequence of the partial tensors.

Next, the respective features of the NN circuit 100 will be explained in detail.

[DMAC 3]

Figure 7:
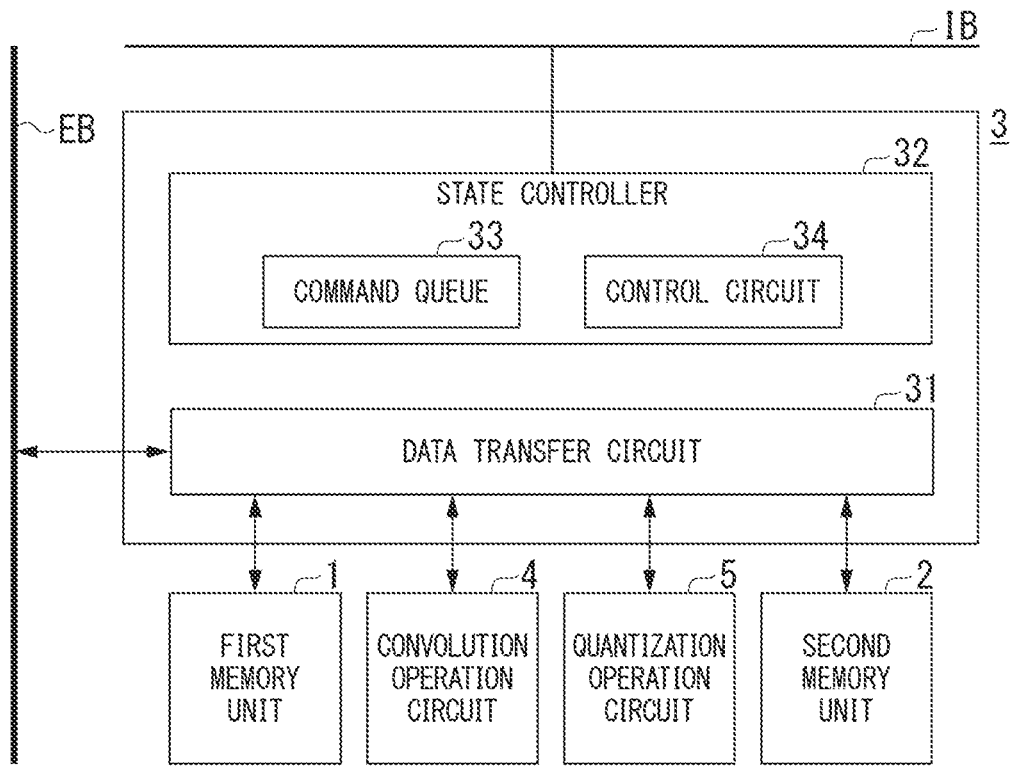
FIG. 7 is an internal block diagram of a DMAC in the neural network circuit.

FIG. 7 is an internal block diagram of the DMAC 3.

The DMAC 3 has a data transfer circuit 31 and a state controller 32. The DMAC 3 has a state controller 32 that is dedicated to the data transfer circuit 31, so that when a command is input therein, DMA data transfer can be implemented without requiring an external controller.

The data transfer circuit 31 is connected to the external bus EB and performs DMA data transfer between the first memory unit 1 and an external memory unit such as DRAM. Additionally, the data transfer circuit 31 performs DMA data transfer between the second memory unit 2 and an external memory unit such as DRAM. Additionally, the data transfer circuit 31 performs data transfer between the convolution operation circuit 4 and an external memory unit such as DRAM. Additionally, the data transfer circuit 31 performs data transfer between the quantization operation circuit 5 and an external memory unit such as DRAM. The number of DMA channels in the data transfer circuit 31 is not limited. For example, the data transfer circuit 31 may have separate DMA channels dedicated to the first memory unit 1 and the second memory unit 2.

The state controller 32 controls the state of the data transfer circuit 31. Additionally, the state controller 32 is connected to the controller 6 via the internal bus IB. The state controller 32 has a command queue 33 and a control circuit 34.

The command queue 33 is a queue in which commands C3 for the DMAC 3 are stored, and is constituted, for example, by an FIFO memory unit. One or more commands C3 are written into the command queue 33 via the internal bus IB.

The control circuit 34 is a state machine that decodes the commands C3 and that sequentially controls the data transfer circuit 31 based on the commands C3. The control circuit 34 may be mounted as a logic circuit, or may be installed by a CPU controlled by software.

Figure 8:
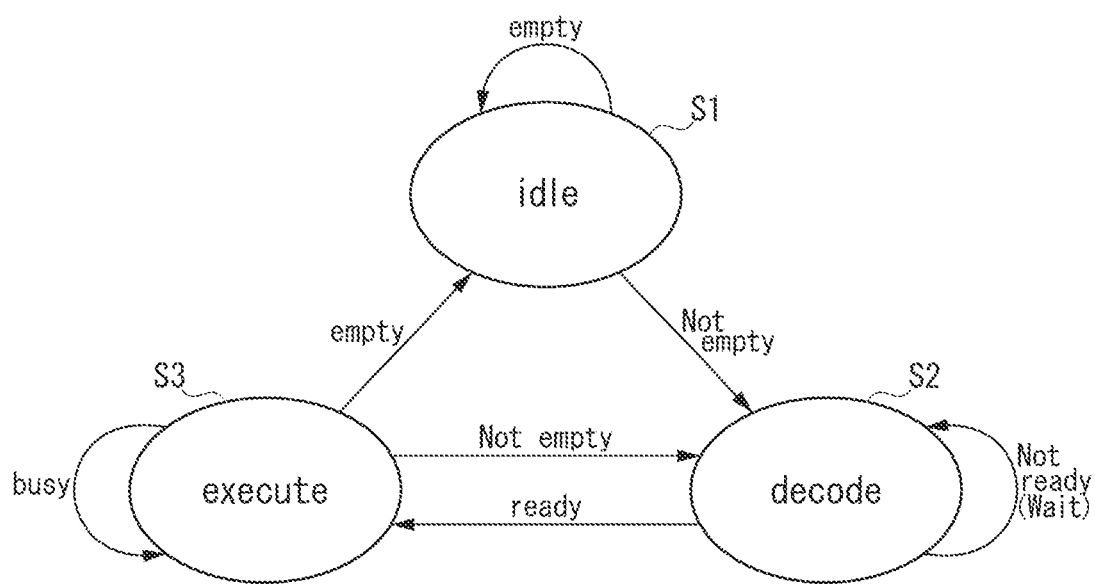
FIG. 8 is a state transition diagram of a control circuit in the DMAC.

FIG. 8 is a state transition diagram of the control circuit 34. The control circuit 34 transitions from an idle state S1 to a decoding state S2 when a command C3 is input (Not empty) to the command queue 33.

In the decoding state S2, the control circuit 34 decodes commands C3 output from the command queue 33. Additionally, the control circuit 34 reads semaphores S stored in the register 61 in the controller 6, and determines whether or not the data transfer circuit 31 can be operated as instructed by the commands C3. If a command cannot be executed (Not ready), then the control circuit 34 waits (Wait) until the command can be executed. If the command can be executed (ready), then the control circuit 34 transitions from the decoding state S2 to an execution state S3.

In the execution state S3, the control circuit 34 controls the data transfer circuit 31 and makes the data transfer circuit 31 carry out operations instructed by the command C3. When the operations in the data transfer circuit 31 end, the control circuit 34 removes the command C3 that has been executed from the command queue 33 and updates the semaphores S stored in the register 61 in the controller 6. If there is a command in the command queue 33 (Not empty), then the control circuit 34 transitions from the execution state S3 to the decoding state S2. If there are no commands in the command queue 33 (empty), then the control circuit 34 transitions from the execution state S3 to the idle state S1.

[Convolution Operation Circuit 4]

Figure 9:
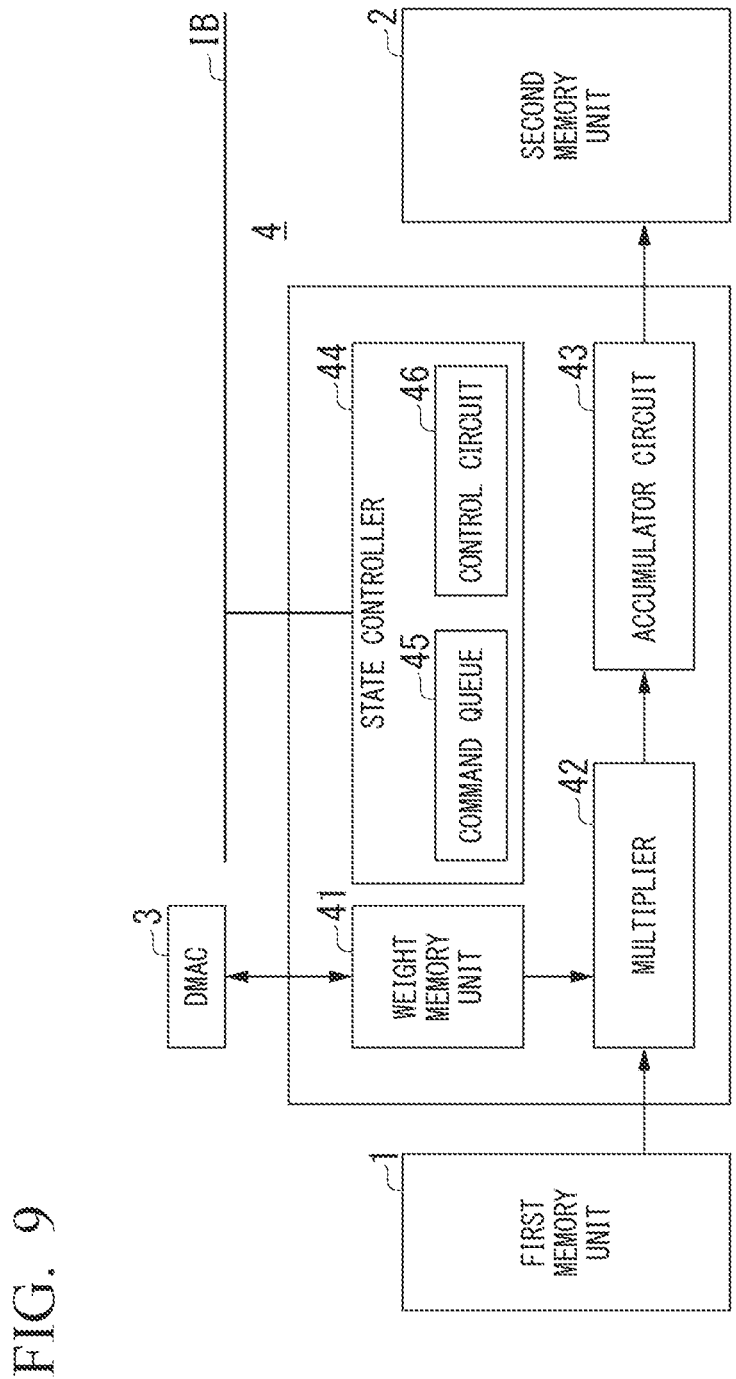
FIG. 9 is an internal block diagram of a convolution operation circuit in the neural network circuit.

FIG. 9 is an internal block diagram of the convolution operation circuit 4.

The convolution operation circuit 4 has a weight memory unit 41, a multiplier 42, an accumulator circuit 43, and a state controller 44. The convolution operation circuit 4 has a state controller 44 that is dedicated to the multiplier 42 and the accumulator circuit 43, so that when a command is input therein, a convolution operation can be implemented without requiring an external controller.

The weight memory unit 41 is a memory unit for storing weights w used for convolution operations, and is, for example, a rewritable memory unit such as a volatile memory unit composed of SRAM (Static Ram) or the like. The DMAC 3 writes into the weight memory unit 41, by means of DMA transfer, the weights w necessary for convolution operations.

Figure 10:
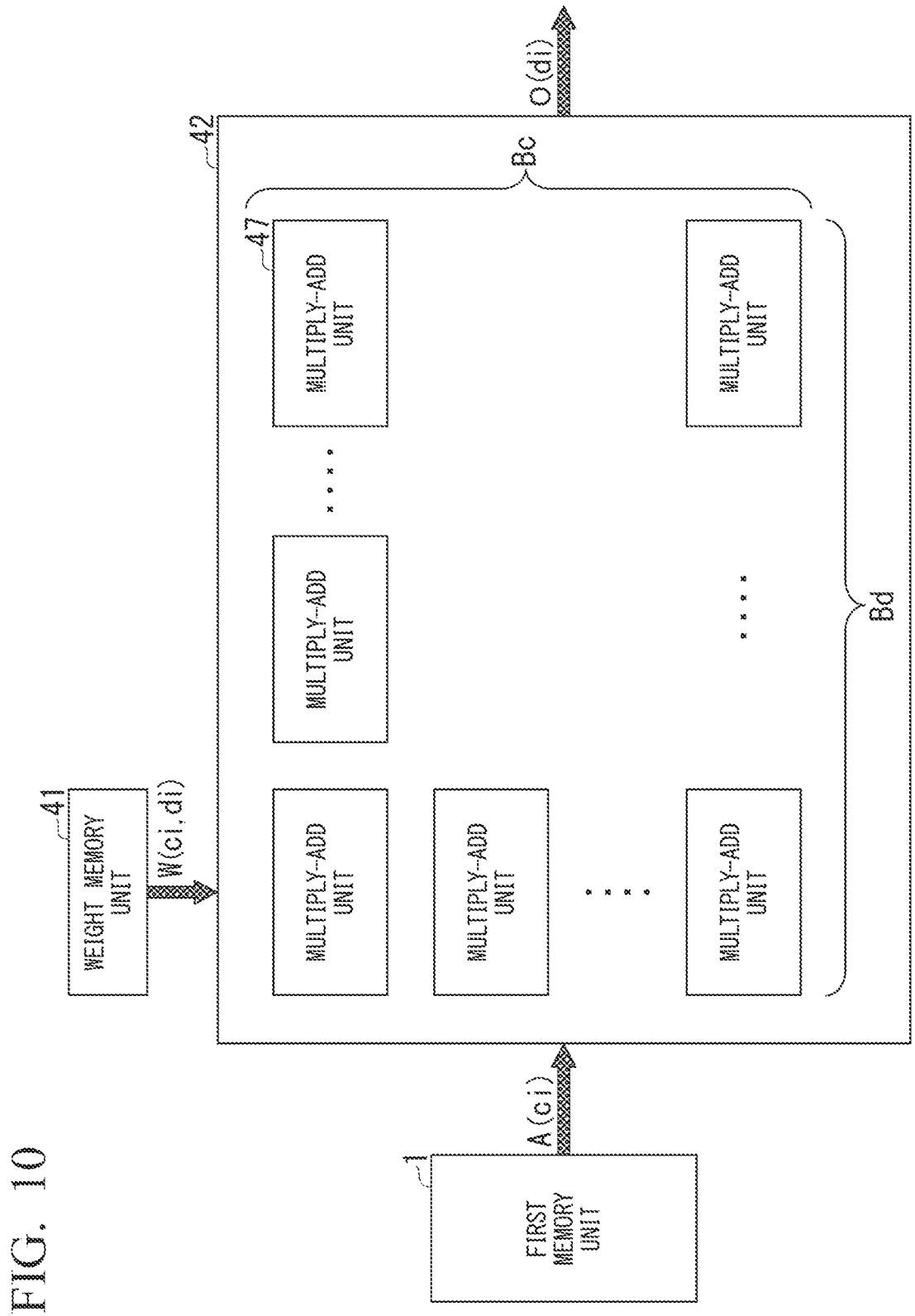
FIG. 10 is an internal block diagram of a multiplier in the convolution operation circuit.

FIG. 10 is an internal block diagram of the multiplier 42.

The multiplier 42 multiplies an input vector A with a weight matrix W. The input vector A, as mentioned above, is vector data having Bc elements in which partitioned input data a(x+i, y+j, co) is expanded for each of i and j. Additionally, the weight matrix W is matrix data having Bc×Bd elements in which partitioned weights w(i, j, co, do) are expanded for each of i and j. The multiplier 42 has Bc×Bd multiply-add operation units 47, which can implement the multiplication of the input vector A and the weight matrix W in parallel.

The multiplier 42 reads out the input vector A and the weight matrix W that need to be multiplied from the first memory unit 1 and the weight memory unit 41, and implements the multiplication. The multiplier 42 outputs Bd multiply-add operation results O(di).

Figure 11:
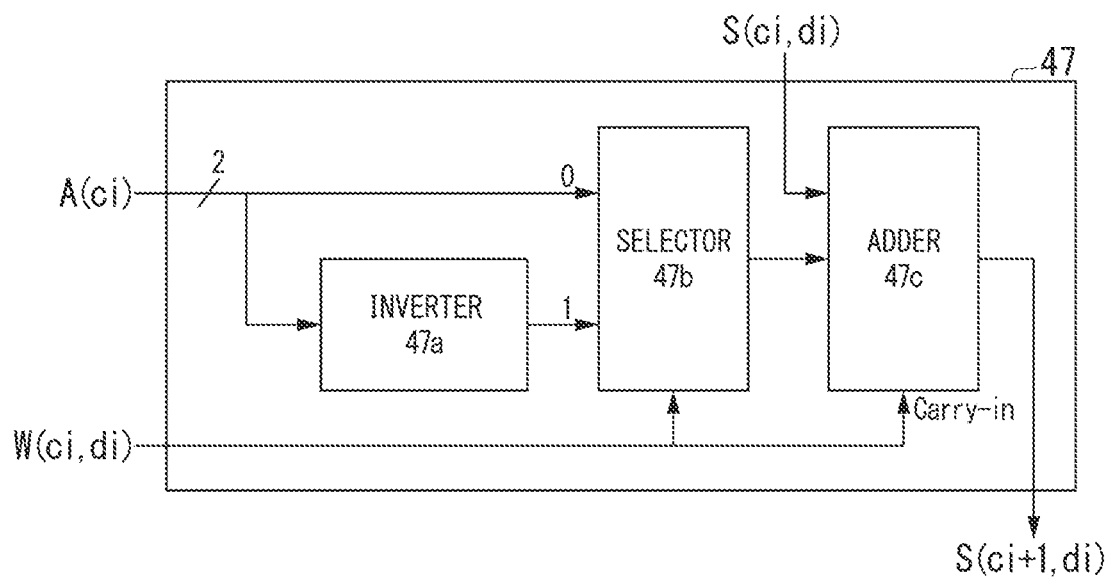
FIG. 11 is an internal block diagram of a multiply-add operation unit in the multiplier.

FIG. 11 is an internal block diagram of a multiply-add operation unit 47.

The multiply-add operation unit 47 implements multiplication of an element A(ci) of the input vector A with an element W(ci, di) of the weight matrix W. Additionally, the multiply-add operation unit 47 adds the multiplication results with the multiplication results S(ci, di) from other multiply-add operation units 47. The multiply-add operation unit 47 outputs the addition result S(ci+1, di). The elements A(ci) are 2-bit unsigned integers (0, 1, 2, 3). The elements W(ci, di) are 1-bit signed integers (0, 1), where the value "0" represents +1 and the value "1" represents −1.

The multiply-add operation unit 47 has an inverter 47a, a selector 47b, and an adder 47c. The multiply-add operation unit 47 performs multiplication using only the inverter 47a and the selector 47b, without using a multiplier. If the element W(ci, di) is "0", then the selector 47b selects to input the element A(ci). If the element W(ci, di) is "1", then the selector 47b selects a complement obtained by inverting the element A(ci) with the inverter. The element W(ci, di) is also input to the Carry-in of the adder 47c. If the element W(ci, di) is "0", then the adder 47c outputs the value obtained by adding the element A(ci) to S(ci, di). If W(ci, di) is "1", then the adder 47c outputs the value obtained by subtracting the element A(ci) from S(ci, di).

Figure 12:
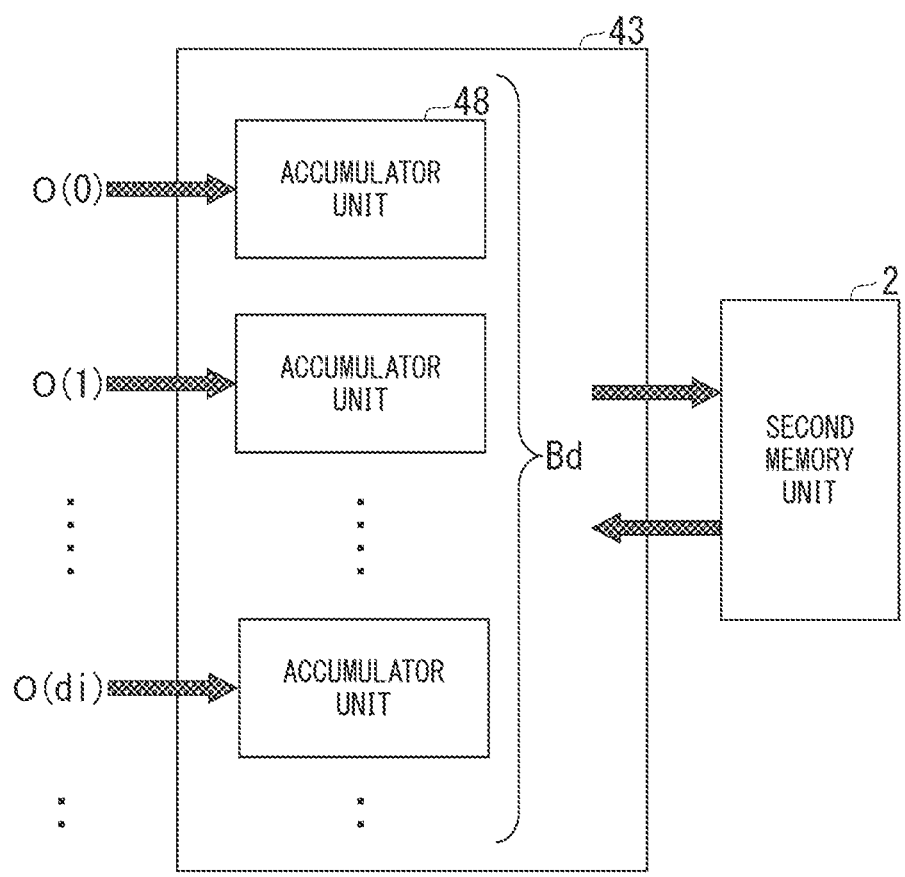
FIG. 12 is an internal block diagram of an accumulator circuit in the convolution operation circuit.

FIG. 12 is an internal block diagram of the accumulator circuit 43.

The accumulator circuit 43 accumulates, in the second memory unit 2, the multiply-add operation results O(di) from the multiplier 42. The accumulator circuit 43 has Bd accumulator units 48 and can accumulate Bd multiply-add operation results O(di) in the second memory unit 2 in parallel.

Figure 13:
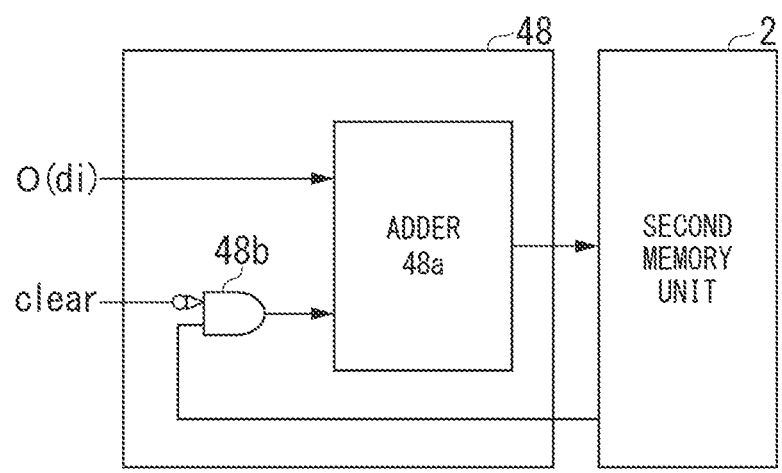
FIG. 13 is an internal block diagram of an accumulator unit in the accumulator circuit.

FIG. 13 is an internal block diagram of an accumulator unit 48.

The accumulator unit 48 has an adder 48a and a mask unit 48b. The adder 48a adds an element O(di) of the multiply-add operation results O to a partial sum that is obtained midway through the convolution operation indicated by Equation 1 stored in the second memory unit 2. The addition results have 16 bits per element. The addition results are not limited to having 16 bits per element, and for example, may have 15 bits or 17 bits per element.

The adder 48a writes the addition results at the same address in the second memory unit 2. If an initialization signal "clear" is asserted, then the mask unit 48b masks the output from the second memory unit 2 and sets the value to be added to the element O(di) to zero. The initialization signal "clear" is asserted when a partial sum that is obtained midway is not stored in the second memory unit 2.

When the convolution operation by the multiplier 42 and the accumulator circuit 43 is completed, output data f(x, y, do) is stored in the second memory unit.

The state controller 44 controls the states of the multiplier 42 and the accumulator circuit 43. Additionally, the state controller 44 is connected to the controller 6 via the internal bus IB. The state controller 44 has a command queue 45 and a control circuit 46.

The command queue 45 is a queue in which commands C4 for the convolution operation circuit 4 are stored, and is constituted, for example, by an FIFO memory unit. Commands C4 are written into the command queue 45 via the internal bus IB.

The control circuit 46 is a state machine that decodes commands C4 and that controls the multiplier 42 and the accumulator circuit 43 based on the commands C4. The control circuit 46 has a structure similar to that of the control circuit 34 in the state controller 32 in the DMAC 3.

[Quantization Operation Circuit 5]

Figure 14:
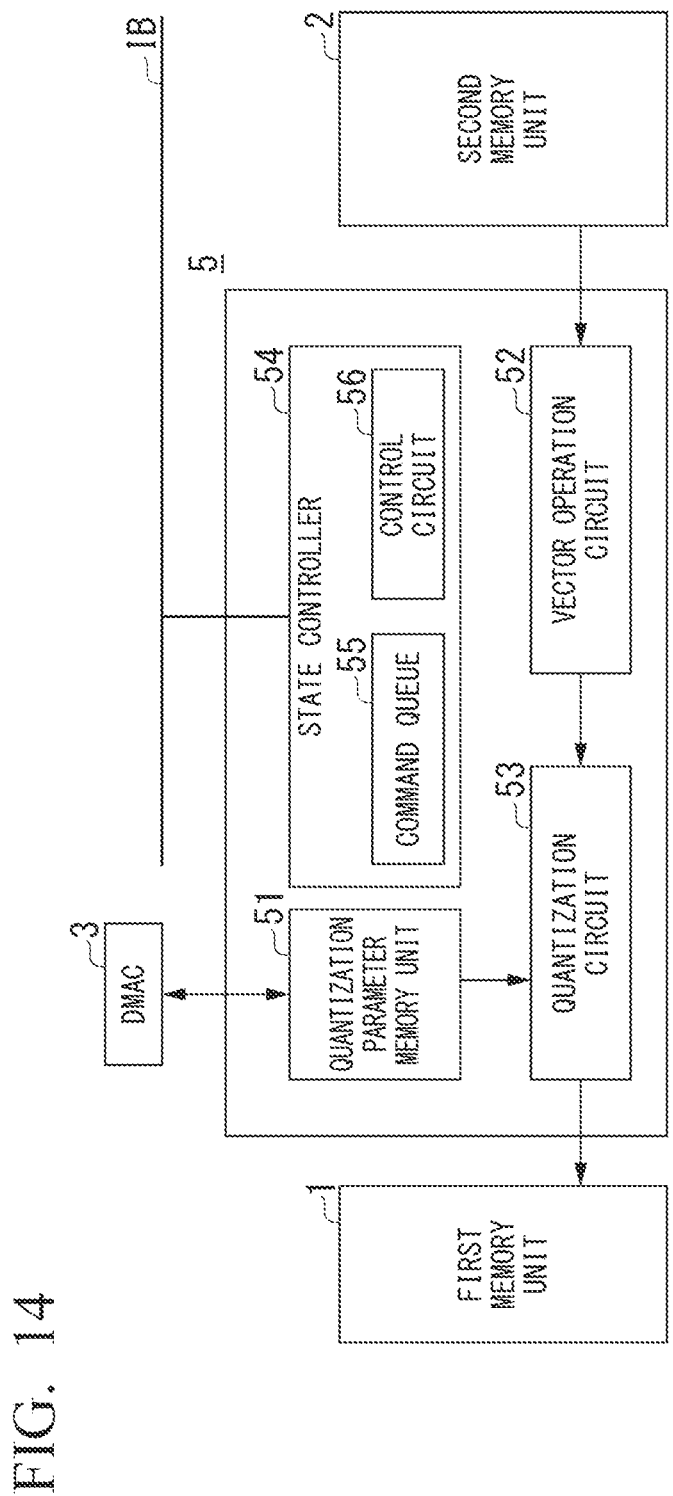
FIG. 14 is an internal block diagram of a quantization operation circuit in the neural network circuit.

FIG. 14 is an internal block diagram of the quantization operation circuit 5.

The quantization operation circuit 5 has a quantization parameter memory unit 51, a vector operation circuit 52, a quantization circuit 53, and a state controller 54. The quantization operation circuit 5 has a state controller 54 that is dedicated to the vector operation circuit 52 and the quantization circuit 53, so that when a command is input therein, a quantization operation can be implemented without requiring an external controller.

The quantization parameter memory unit 51 is a memory unit for storing quantization parameters q used for quantization operations, and is, for example, a rewritable memory unit such as a volatile memory unit composed of SRAM (Static Ram) or the like. The DMAC 3 writes into the quantization parameter memory unit 51, by means of DMA transfer, the quantization parameters q necessary for quantization operations.

Figure 15:
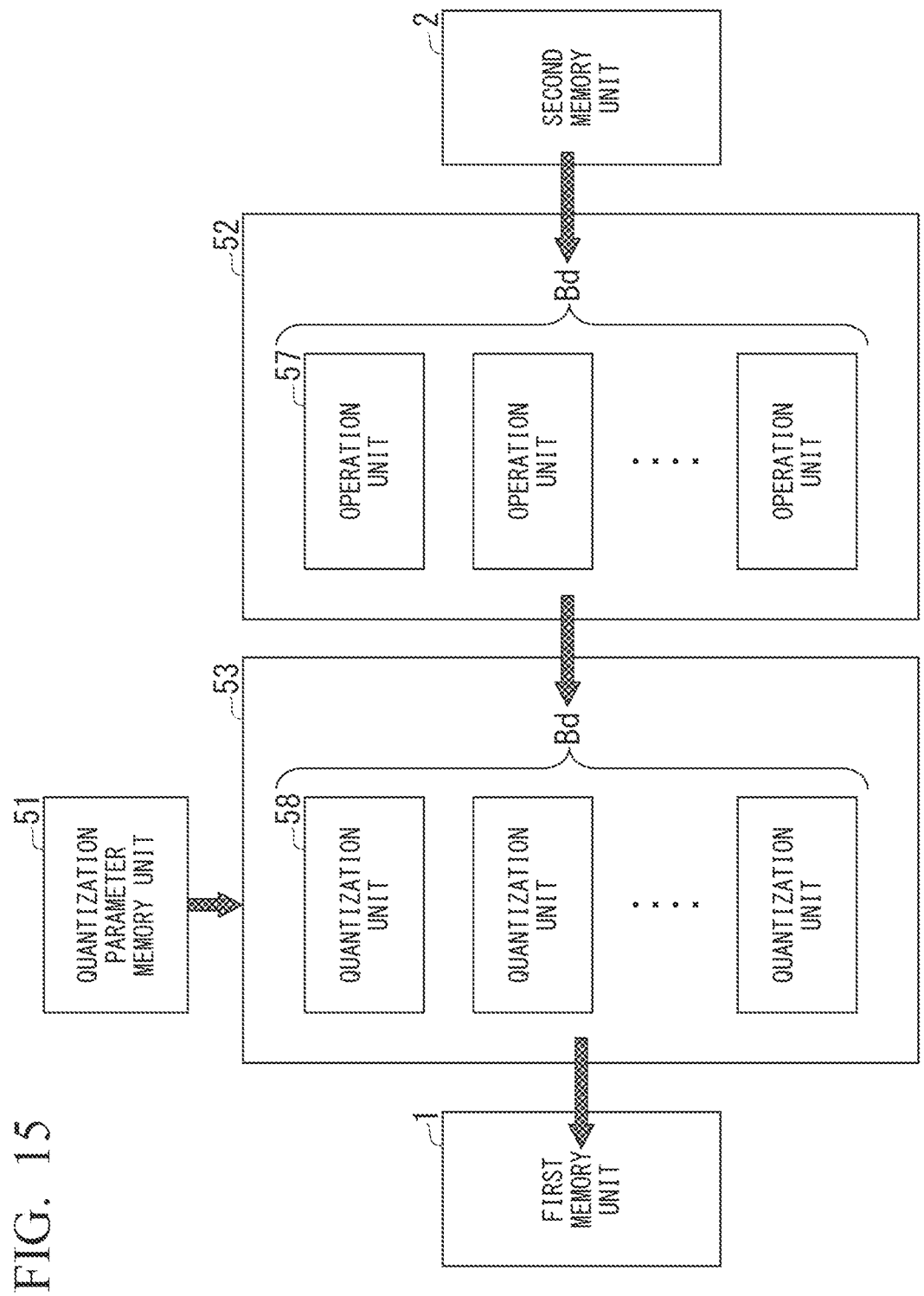
FIG. 15 is an internal block diagram of a vector operation circuit and a quantization circuit in the quantization operation circuit.

FIG. 15 is an internal block diagram of the vector operation circuit 52 and the quantization circuit 53.

The vector operation circuit 52 performs operations on output data f(x, y, do) stored in the second memory unit 2. The vector operation circuit 52 has Bd operation units 57, and performs SIMD operations on the output data f(x, y, do) in parallel.

Figure 16:
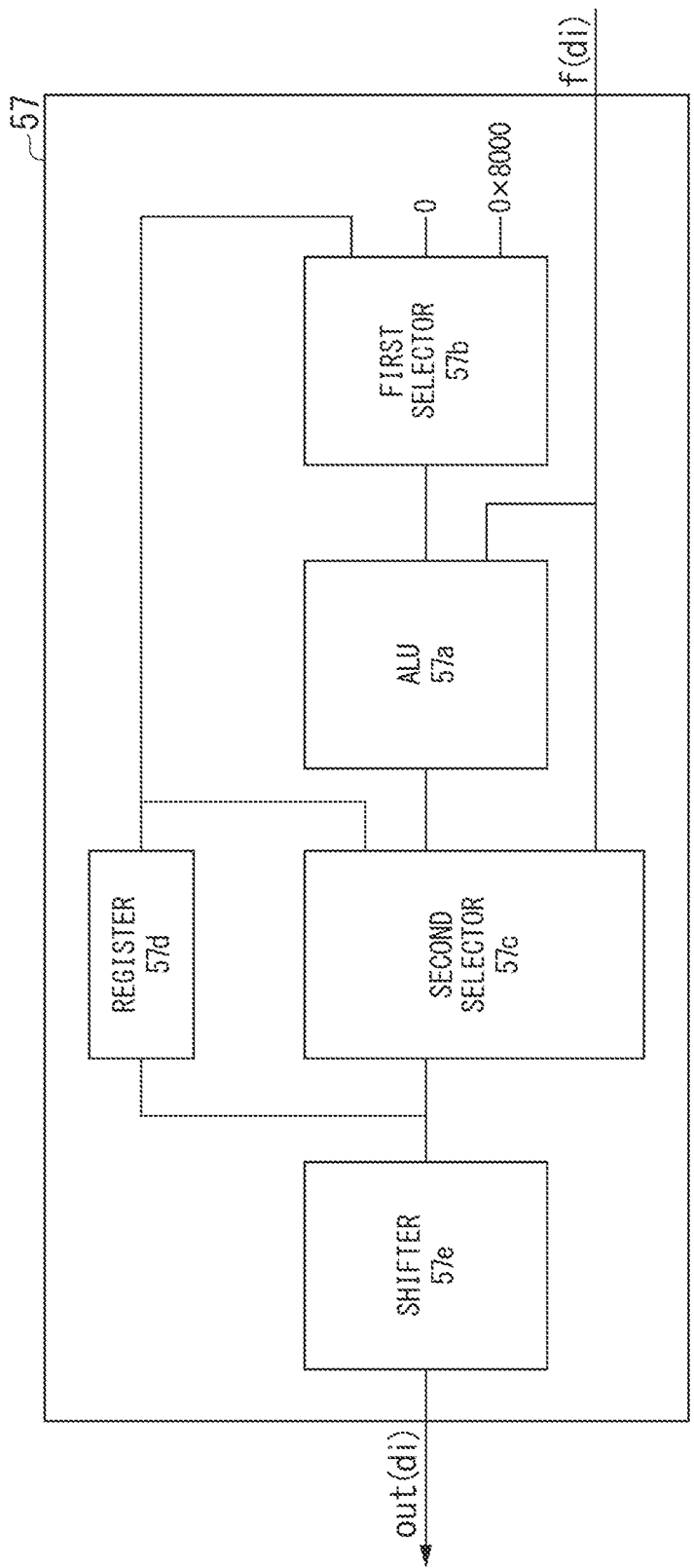
FIG. 16 is a block diagram of an operation unit.

FIG. 16 is a block diagram of an operation unit 57.

The operation unit 57 has, for example, an ALU 57a, a first selector 57b, a second selector 57c, a register 57d, and a shifter 57e. The operation unit 57 may further have other operators or the like that are included in known general-purpose SIMD operation circuits.

The vector operation circuit 52 combines the operators and the like in the operation units 57, thereby performing, on the output data f(x, y, do), the operations of at least one of the pooling layer 221, the batch normalization layer 222, or the activation function layer 223 in the quantization operation layer 220.

The operation unit 57 can use the ALU 57a to add the data stored in the register 57d to an element f(di) in the output data f(x, y, do) read from the second memory unit 2. The operation unit 57 can store the addition results from the ALU 57a in the register 57d. The operation unit 57 can initialize the addition results by using the first selector 57b to select a "0" as the value to be input to the ALU 57a instead of the data stored in the register 57d. For example, if the pooling region is 2×2, then the shifter 57e can output the average value of the addition results by shifting the output from the ALU 57a two bits to the right. The vector operation circuit 52 can implement the average pooling operation indicated by Equation 2 by having the Bd operation units 57 repeatedly perform the abovementioned operations and the like.

The operation unit 57 can use the ALU 57a to compare the data stored in the register 57d with an element f(di) in the output data f(x, y, do) read from the second memory unit 2. The operation unit 57 can control the second selector 57c in accordance with the comparison result from the ALU 57a, and can select the larger of the element f(di) and the data stored in the register 57d. The operation unit 57 can initialize the value to be compared so as to be the minimum value that the element f(di) may have by using the first selector 57b to select the minimum value as the value to be input to the ALU 57a. In the present embodiment, the element f(di) is a 16-bit signed integer, and thus, the minimum value that the element f(di) may have is "0x8000". The vector operation circuit 52 can implement the max pooling operation in Equation 3 by having the Bd operation units 57 repeatedly perform the abovementioned operations and the like. In the max pooling operation, the shifter 57e does not shift the output of the second selector 57c.

The operation unit 57 can use the ALU 57a to perform subtraction between the data stored in the register 57d and an element f(di) in the output data f(x, y, do) read from the second memory unit 2. The shifter 57e can shift the output of the ALU 57a to the left (i.e., multiplication) or to the right (i.e., division). The vector operation circuit 52 can implement the batch normalization operation in Equation 4 by having the Bd operation units 57 repeatedly perform the abovementioned operations and the like.

The operation unit 57 can use the ALU 57a to compare an element f(di) in the output data f(x, y, do) read from the second memory unit 2 with "0" selected by the first selector 57b. The operation unit 57 can, in accordance with the comparison result in the ALU 57a, select and output either the element f(di) or the constant value "0" prestored in the register 57d. The vector operation circuit 52 can implement the ReLU operation in Equation 5 by having the Bd operation units 57 repeatedly perform the abovementioned operations and the like.

The vector operation circuit 52 can implement average pooling, max pooling, batch normalization, and activation function operations, as well as combinations of these operations. The vector operation circuit 52 can implement general-purpose SIMD operations, and thus may implement other operations necessary for operations in the quantization operation layer 220. Additionally, the vector operation circuit 52 may implement operations other than operations in the quantization operation layer 220.

The quantization operation circuit 5 need not have a vector operation circuit 52. If the quantization operation circuit 5 does not have a vector operation circuit 52, then the output data f(x, y, do) is input to the quantization circuit 53.

The quantization circuit 53 performs quantization of the output data from the vector operation circuit 52. The quantization circuit 53, as illustrated in FIG. 15, has Bd quantization units 58, and performs operations on the output data from the vector operation circuit 52 in parallel.

Figure 17:
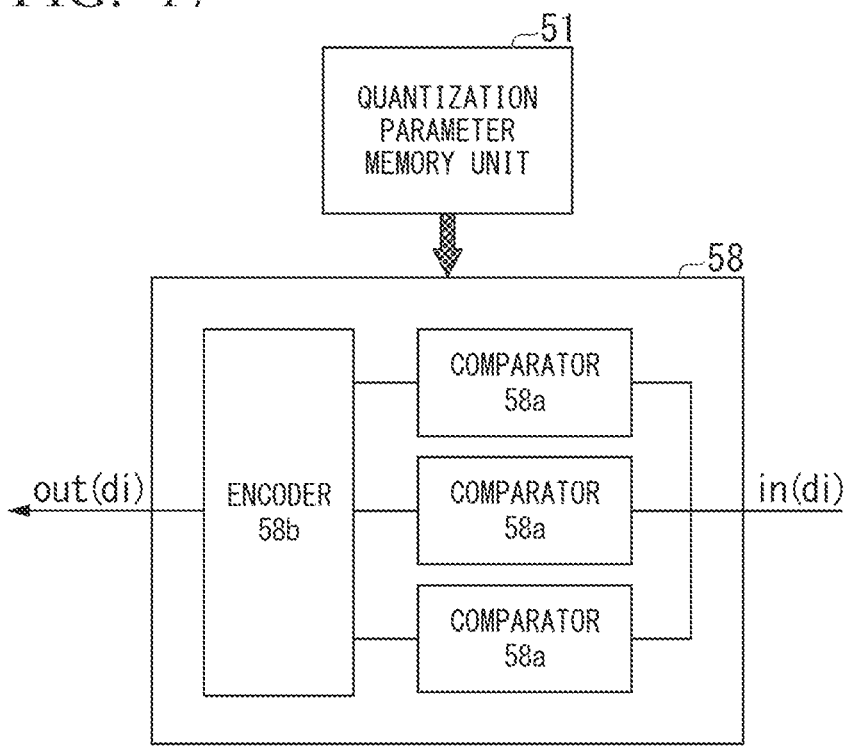
FIG. 17 is an internal block diagram of a vector quantization unit in the quantization circuit.

FIG. 17 is an internal block diagram of a quantization unit 58.

The quantization unit 58 performs quantization of an element in(di) in the output data from the vector operation circuit 52. The quantization unit 58 has a comparator 58a and an encoder 58b. The quantization unit 58 performs, on output data (16 bits/element) from the vector operation circuit 52, an operation (Equation 6) of the quantization layer 224 in the quantization operation layer 220. The quantization unit 58 reads the necessary quantization parameters q(th0, th1, th2) from the quantization parameter memory unit 51 and uses the comparator 58a to compare the input in(di) with the quantization parameter q. The quantization unit 58 uses the encoder 58b to quantize the comparison results from the comparator 58a to 2 bits/element. In Equation 4, $\alpha(c)$ and $\beta(c)$ are parameters that are different for each variable c. Thus, the quantization parameters q(th0, th1, th2), which reflect $\alpha(c)$ and $\beta(c)$, are parameters that are different for each value of in(di).

The quantization unit 58 classifies the input in(di) into four regions (for example, in≤th0, th0<in≤th1, th1<in≤th2, th2<in) by comparing the input in(di) with the three threshold values th0, th1 and th2. The classification results are encoded in two bits and output. The quantization unit 58 can also perform batch normalization and activation function operations in addition to quantization by setting the quantization parameters q(th0, th1, th2).

The quantization unit 58 can implement the batch normalization operation indicated in Equation 4 in addition to quantization by performing quantization with the threshold value th0 set to $\beta(c)$ in Equation 4 and with the differences (th1-th0) and (th2-th1) between the threshold values set to $\alpha(c)$ in Equation 4. The value of $\alpha(c)$ can be made smaller by making (th1-th0) and (th2-th1) larger. The value of $\alpha(c)$ can be made larger by making (th1-th0) and (th2-th1) smaller.

The quantization unit 58 can implement the ReLU operation in the activation function in addition to quantization of the input in(di). For example, the output value of the quantization unit 58 is saturated in the regions where in(di)≤th0 and th2<in(di). The quantization unit 58 can implement the activation function operation by setting the quantization parameter q so that the output becomes nonlinear.

The state controller 54 controls the states of the vector operation circuit 52 and the quantization circuit 53. Additionally, the state controller 54 is connected to the controller 6 by the internal bus IB. The state controller 54 has a command queue 55 and a control circuit 56.

The command queue 55 is a queue in which commands C5 for the quantization operation circuit 5 are stored, and is constituted, for example, by an FIFO memory unit. Commands C5 are written into the command queue 55 via the internal bus IB.

The control circuit 56 is a state machine that decodes commands C5 and that controls the vector operation circuit 52 and the quantization circuit 53 based on the commands C5. The control circuit 56 has a structure similar to the control circuit 34 of. The state controller 32 in the DMAC 3.

The quantization operation circuit 5 writes quantization operation output data having Bd elements into the first memory unit 1. The preferable relationship between Bd and Bc is indicated by Equation 10. In Equation 10, n is an integer.

$$Bd=2^n \cdot Bc \qquad \text{Equation 10:}$$

[Controller 6]

The controller 6 transfers commands that have been transferred from an external host CPU to the command queues in the DMAC 3, the convolution operation circuit 4 and the quantization operation circuit 5. The controller 6 may have a command memory unit for storing the commands for each circuit.

The controller 6 is connected to the external bus EB and operates as a slave to an external host CPU. The controller 6 has a register 61 including a parameter register and a state register. The parameter register is a register for controlling the operation of the NN circuit 100. The state register is a register indicating the state of the NN circuit 100 and including semaphores S.

[Semaphore S]

Figure 18:
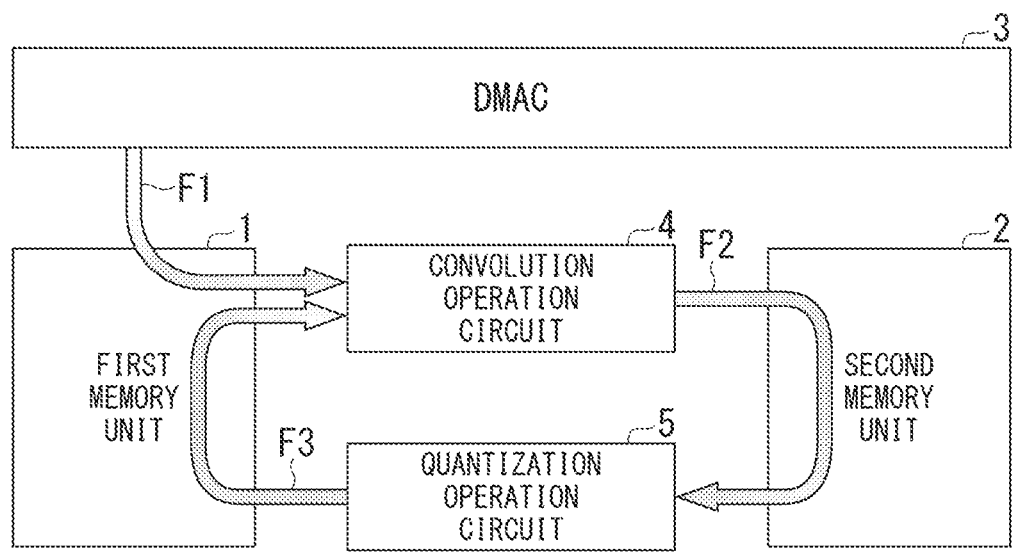
FIG. 18 is a diagram explaining control of the neural network circuit by semaphores.

FIG. 18 is a diagram explaining the control of the NN circuit 100 by semaphores S.

The semaphores S include first semaphores S1, second semaphores S2, and third semaphores S3. The semaphores S are decremented by P operations and incremented by V operations. P operations and V operations by the DMAC 3, the convolution operation circuit 4, and the quantization operation circuit 5 update the semaphores S in the controller 6 via the internal bus IB.

The first semaphores S1 are used to control the first data flow F1. The first data flow F1 is data flow by which the DMAC 3 (Producer) writes input data a into the first memory unit 1 and the convolution operation circuit 4 (Consumer) reads the input data a.

The first semaphores S1 include a first write semaphore S1W and a first read semaphore S1R.

The second semaphores S2 are used to control the second data flow F2. The second data flow F2 is data flow by which the convolution operation circuit 4 (Producer) writes output data f into the second memory unit 2 and the quantization operation circuit 5 (Consumer) reads the output data f. The second semaphores S2 include a second write semaphore S2W and a second read semaphore S2R.

The third semaphores S3 are used to control the third data flow F3. The third data flow F3 is data flow by which the quantization operation circuit 5 (Producer) writes quantization operation output data into the first memory unit 1 and the convolution operation circuit 4 (Consumer) reads the quantization operation output data from the quantization operation circuit 5. The third semaphores S3 include a third write semaphore S3W and a third read semaphore S3R.

[First data flow F1]

Figure 19:
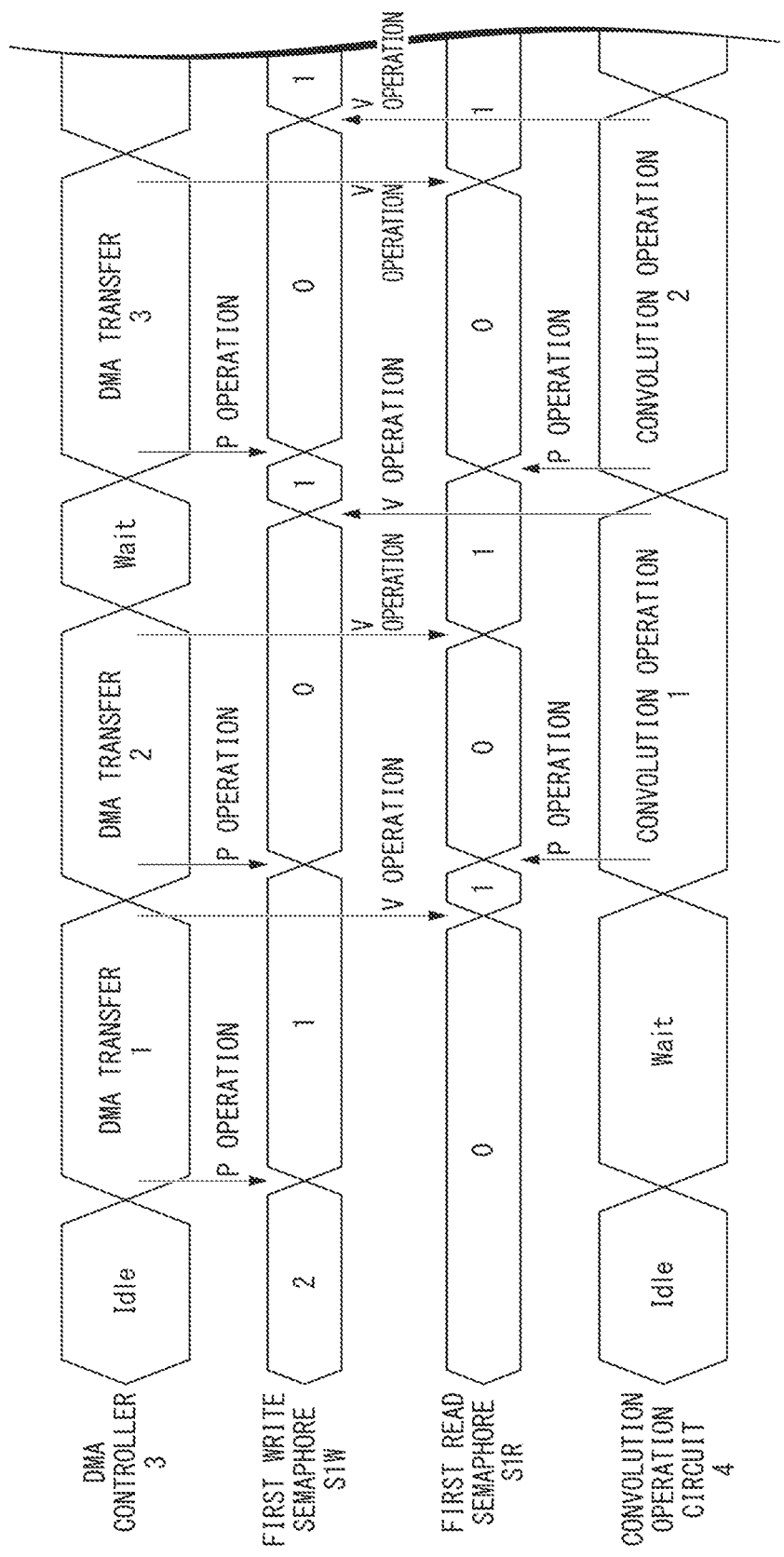
FIG. 19 is a timing chart of first data flow.

FIG. 19 is a timing chart of first data flow F1.

The first write semaphore S1W is a semaphore that restricts writing into the first memory unit 1 by the DMAC 3 in the first data flow F1. The first write semaphore S1W indicates, for example, among the memory areas in the first memory unit 1 in which data of a prescribed size, such as that of an input vector A, can be stored, the number of memory areas from which data has been read and into which other data can be written. If the first write semaphore S1W is "0", then the DMAC 3 cannot perform the writing in the first data flow F1 with respect to the first memory unit 1, and the DMAC 3 must wait until the first write semaphore S1W becomes at least "1".

The first read semaphore S1R is a semaphore that restricts reading from the first memory unit 1 by the convolution operation circuit 4 in the first data flow F1. The first read semaphore S1R indicates, for example, among the memory areas in the first memory unit 1 in which data of a prescribed size, such as that of an input vector A, can be stored, the number of memory areas into which data has been written and can be read. If the first read semaphore S1R is "0", then the convolution operation circuit 4 cannot perform the reading in the first data flow F1 with respect to the first memory unit 1, and the convolution operation circuit 4 must wait until the first read semaphore S1R becomes at least "1".

The DMAC 3 initiates DMA transfer when a command C3 is stored in the command queue 33. As indicated in FIG. 19, the first write semaphore S1W is not "0". Thus, the DMAC 3 initiates DMA transfer (DMA transfer 1). The DMAC 3 performs a P operation on the first write semaphore S1W when DMA transfer is initiated. The DMAC 3 performs a V operation on the first read semaphore S1R after the DMA transfer is completed.

The convolution operation circuit 4 initiates a convolution operation when a command C4 is stored in the command queue 45. As indicated in FIG. 19, the first read semaphore S1R is "0". Thus, the convolution operation circuit 4 must wait until the first read semaphore S1R becomes at least "1" ("Wait" in the decoding state S2). When the DMAC 3 performs the V operation and thus the first read semaphore S1R becomes "1", the convolution operation circuit 4 initiates a convolution operation (convolution operation 1). The convolution operation circuit 4 performs a P operation on the first read semaphore S1R when initiating the convolution operation. The convolution operation circuit 4 performs a V operation on the first write semaphore S1W after the convolution operation is completed.

When the DMAC 3 initiates the DMA transfer indicated as the "DMA transfer 3" in FIG. 19, the first write semaphore S1W is "0". Thus, the DMAC 3 must wait until the first write semaphore S1W becomes at least "1" ("Wait" in the decoding state S2). When the convolution operation circuit 4 performs the V operation and thus the first write semaphore S1W becomes at least "1", the DMAC 3 initiates the DMA transfer.

The DMAC 3 and the convolution operation circuit 4 can prevent competing access to the first memory unit 1 in the first data flow F1 by using the semaphores S1. Additionally, the DMAC 3 and the convolution operation circuit 4 can operate independently and in parallel while synchronizing data transfer in the first data flow F1 by using the semaphores S1.

[Second data flow F2]

Figure 20:
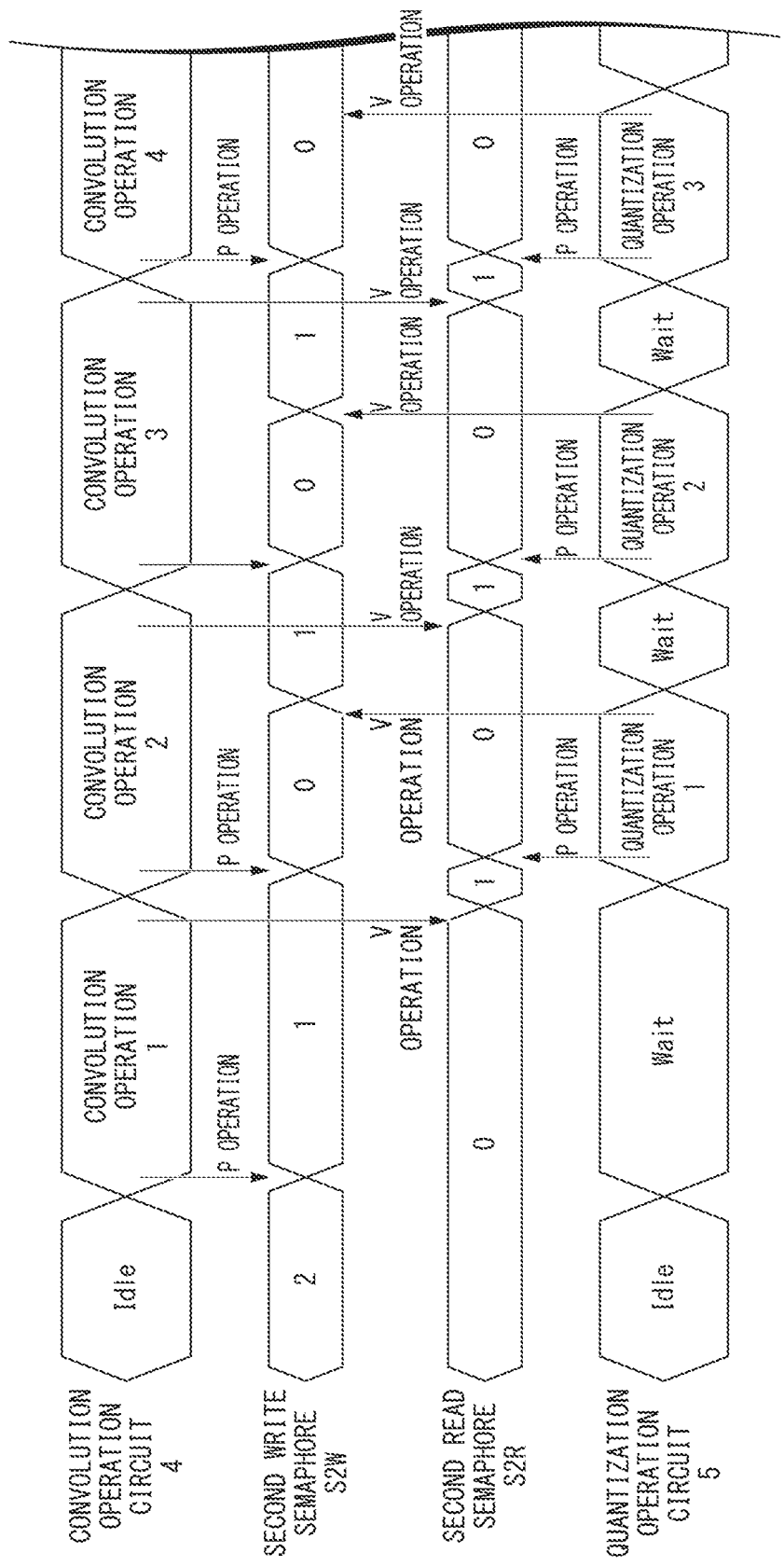
FIG. 20 is a timing chart of second data flow.

FIG. 20 is a timing chart of second data flow F2.

The second write semaphore S2W is a semaphore that restricts writing into the second memory unit 2 by the convolution operation circuit 4 in the second data flow F2.

The second write semaphore S2W indicates, for example, among the memory areas in the second memory unit 2 in which data of a prescribed size, such as that of output data f, can be stored, the number of memory areas from which data has been read and into which other data can be written. If the second write semaphore S2W is "0", then the convolution operation circuit 4 cannot perform the writing in the second data flow F2 with respect to the second memory unit 2, and the convolution operation circuit 4 must wait until the second write semaphore S2W becomes at least "1".

The second read semaphore S2R is a semaphore that restricts reading from the second memory unit 2 by the quantization operation circuit 5 in the second data flow F2. The second read semaphore S2R indicates, for example, among the memory areas in the second memory unit 2 in which data of a prescribed size, such as that of output data f, can be stored, the number of memory areas into which data has been written and can be read. If the second read semaphore S2R is "0", then the quantization operation circuit 5 cannot perform the reading in the second data flow F2 with respect to the second memory unit 2, and the quantization operation circuit 5 must wait until the second read semaphore S2R becomes at least "1".

As indicated in FIG. 20, the convolution operation circuit 4 performs a P operation on the second write semaphore S2W when the convolution operation is initiated. The convolution operation circuit 4 performs a V operation on the second read semaphore S2R after the convolution operation is completed.

The quantization operation circuit 5 initiates a quantization operation when a command C5 is stored in the command queue 55. As indicated in FIG. 20, the second read semaphore S2R is "0". Thus, the quantization operation circuit 5 must wait until the second read semaphore S2R becomes at least "1" ("Wait" in the decoding state S2). When the convolution operation circuit 4 performs the V operation and thus the second read semaphore S2R becomes "1", the quantization operation circuit 5 initiates the quantization operation (quantization operation 1). The quantization operation circuit 5 performs a P operation on the second read semaphore S2R when initiating the quantization operation. The quantization operation circuit 5 performs a V operation on the second write semaphore S2W after the quantization operation is completed.

When the quantization operation circuit 5 initiates the quantization operation indicated as the "quantization operation 2" in FIG. 20, the second read semaphore S2R is "0". Thus, the quantization operation circuit 5 must wait until the second read semaphore S2R becomes at least "1" ("Wait" in the decoding state S2). When the convolution operation circuit 4 performs the V operation and thus the second read semaphore S2R becomes at least "1", the quantization operation circuit 5 initiates the quantization operation.

The convolution operation circuit 4 and the quantization operation circuit 5 can prevent competing access to the second memory unit 2 in the second data flow F2 by using the semaphores S2. Additionally, the convolution operation circuit 4 and the quantization operation circuit 5 can operate independently and in parallel while synchronizing data transfer in the second data flow F2 by using the semaphores S2.

[Third data flow F3]

The third write semaphore S3W is a semaphore that restricts writing into the first memory unit 1 by the quantization operation circuit 5 in the third data flow F3. The third write semaphore S3W indicates, for example, among the memory areas in the first memory unit 1 in which data of a prescribed size, such as that of quantization operation output data from the quantization operation circuit 5, can be stored, the number of memory areas from which data has been read and into which other data can be written. If the third write semaphore S3W is "0", then the quantization operation circuit 5 cannot perform the writing in the third data flow F3 with respect to the first memory unit 1, and the quantization operation circuit 5 must wait until the third write semaphore S3W becomes at least "1".

The third read semaphore S1R is a semaphore that restricts reading from the first memory unit 1 by the convolution operation circuit 4 in the third data flow F3. The third read semaphore S3R indicates, for example, among the memory areas in the first memory unit 1 in which data of a prescribed size, such as that of quantization operation output data from the quantization operation circuit 5, can be stored, the number of memory areas into which data has been written and can be read. If the third read semaphore S3R is "0", then the convolution operation circuit 4 cannot perform the reading in the third data flow F3 with respect to the first memory unit 1, and the convolution operation circuit 4 must wait until the third read semaphore S3R becomes at least "1".

The quantization operation circuit 5 and the convolution operation circuit 4 can prevent competing access to the first memory unit 1 in the third data flow F3 by using the semaphores S3. Additionally, the quantization operation circuit 5 and the convolution operation circuit 4 can operate independently and in parallel while synchronizing data transfer in the third data flow F3 by using the semaphores S3.

The first memory unit 1 is shared by the first data flow F1 and the third data flow F3. The NN circuit 100 can synchronize data transfer while distinguishing between the first data flow F1 and the third data flow F3 by providing the first semaphores S1 and the third semaphores S3 separately.

[Operation (1) of convolution operation circuit 4]

When performing a convolution operation, the convolution operation circuit 4 reads from the first memory unit 1 and writes into the second memory unit 2. In other words, the convolution operation circuit 4 is a Consumer in the first data flow F1 and is a Producer in the second data flow F2. For this reason, when initiating the convolution operation, the convolution operation circuit 4 performs a P operation on the first read semaphore S1R (see FIG. 19) and performs a P operation on the second write semaphore S2W (see FIG. 20). After completing the convolution operation, the convolution operation circuit 4 performs a V operation on the first write semaphore S1W (see FIG. 19) and performs a V operation on the second read semaphore S2R (see FIG. 20).

When initiating the convolution operation, the convolution operation circuit 4 must wait until the first read semaphore S1R becomes at least "1", and the second write semaphore S2W becomes at least "1" ("Wait" in the decoding state S2).

[Operation of quantization operation circuit 5]

When performing a quantization operation, the quantization operation circuit 5 reads from the second memory unit 2 and writes into the first memory unit 1. In other words, the quantization operation circuit 5 is a Consumer in the second data flow F2 and is a Producer in the third data flow F3. For this reason, when initiating the quantization operation, the quantization operation circuit 5 performs a P operation on the second read semaphore S2R and performs a P operation on the third write semaphore S3W. After completing the quantization operation, the quantization operation circuit 5 performs a V operation on the second write semaphore S2W and performs a V operation on the third read semaphore S3R.

When initiating the quantization operation, the quantization operation circuit 5 must wait until the second read semaphore S2R becomes at least "1", and the third write semaphore S3W becomes at least "1" ("Wait" in the decoding state S2).

[Operation (2) of convolution operation circuit 4]

There are cases in which the input data that the convolution operation circuit 4 reads from the first memory unit 1 is data written by the quantization operation circuit 5 in the third data flow. In such a case, the convolution operation circuit 4 is a Consumer in the third data flow F3 and is a Producer in the second data flow F2. For this reason, when initiating the convolution operation, the convolution operation circuit 4 performs a P operation on the third read semaphore S3R and performs a P operation on the second write semaphore S2W. After completing the convolution operation, the convolution operation circuit 4 performs a V operation on the third write semaphore S3W and performs a V operation on the second read semaphore S2R.

When initiating the convolution operation, the convolution operation circuit 4 must wait until the third read semaphore S3R becomes at least "1", and the second write semaphore S2W becomes at least "1" ("Wait" in the decoding state S2).

As explained above, with the NN circuit 100 according to the present embodiment, the convolution operation circuit 4 and the quantization operation circuit 5 form a loop, and the convolution operation circuit 4 and the quantization operation circuit 5 perform the operations of the CNN 200 indicated in FIG. 1 in an alternating manner (FIG. 5) or in parallel (FIG. 6). For this reason, the NN circuit 100 has a small circuit size and can be embedded in embedded devices such as IoT devices.

With the NN circuit 100 according to the present embodiment, the input data to the convolution operation circuit 4 is quantized by the quantization operation circuit 5. For this reason, the amount of computation by the convolution operation circuit 4 can be reduced, thereby reducing the circuit size of the convolution operation circuit 4.

With the NN circuit 100 according to the present embodiment, the DMAC 3, the quantization operation circuit 5, and the convolution operation circuit 4 can operate independently or in parallel while using semaphores S to synchronize data transfer in the data flow being used. Additionally, in the NN circuit 100 according to the present embodiment, the data transfer can be synchronized while distinguishing between data flows by providing semaphores separately for each data flow. For this reason, the NN circuit 100 has faster processing speed and has higher performance in comparison with the case in which each circuit is executed sequentially.

While a first embodiment of the present invention has been described in detail with reference to the drawings above, the specific structure is not limited to this embodiment, and design changes or the like within a range not departing from the spirit of the present invention are also included. Additionally, the structural elements indicated in the above embodiment and the modified examples may be combined as appropriate.

MODIFIED EXAMPLE 1

In the above embodiment, the first memory unit 1 and the second memory unit 2 were separate memory units. However, the first memory unit 1 and the second memory unit 2 are not limited to such an embodiment. The first memory unit 1 and the second memory unit 2 may, for example, be a first memory area and a second memory area in the same memory unit.

MODIFIED EXAMPLE 2

In the above embodiment, the semaphores S were provided for the first data flow F1, the second data flow F2, and the third data flow F3. However, the semaphores S are not limited to such an embodiment. The semaphores S may, for example, be provided for the data flow by which the DMAC 3 writes the weights w into the weight memory unit 41 and the multiplier 42 reads the weights w. The semaphores S may, for example, be provided for the data flow by which the DMAC 3 writes quantization parameters q into the quantization parameter memory unit 51 and the quantization circuit 53 reads the quantization parameters q.

MODIFIED EXAMPLE 3

For example, the data input to the NN circuit described in the above embodiment need not be limited to a single form, and may be composed of still images, moving images, audio, text, numerical values, and combinations thereof. The data input to the NN circuit 100 is not limited to being measurement results from a physical amount measuring device such as an optical sensor, a thermometer, a Global Positioning System (GPS) measuring device, an angular velocity measuring device, a wind speed meter, or the like that may be installed in an edge device in which the NN circuit 100 is provided. The data may be combined with different information such as base station information received from a peripheral device by cable or wireless communication, information from vehicles, ships or the like, weather information, peripheral information such as information relating to congestion conditions, financial information, personal information, or the like.

MODIFIED EXAMPLE 4

While the edge device in which the NN circuit 100 is provided is contemplated as being a device that is driven by a battery or the like, as in a communication device such as a mobile phone or the like, a smart device such as a personal computer, a digital camera, a game device, or a mobile device in a robot product or the like, the edge device is not limited thereto. Effects not obtained by other prior examples can be obtained by utilization in products for which there is a demand for long-term driving or for reducing product heat generation, or for restricting the peak electric power that can be supplied by Power on Ethernet (PoE) or the like. For example, by applying the invention to an on-board camera mounted on a vehicle, a ship, or the like, or to a security camera provided in a public facility or on a road, not only can long-term image capture be realized, but also, the invention can contribute to weight reduction and higher durability. Additionally, similar effects can be achieved by applying the invention to a display device on a television, a monitor, or the like, to a medical device such as a medical camera or a surgical robot, or to a working robot used at a production site or at a construction site.

MODIFIED EXAMPLE 5

The NN circuit 100 may be realized by using one or more processors for part of or for the entirety of the NN circuit 100. For example, in the NN circuit 100, some or all of the input layer or the output layer may be realized by software processes in a processor. Some of the input layer or the output layer realized by software processes consists, for example, of data normalization and conversion. As a result thereof, the invention can handle various types of input formats or output formats. The software executed by the processor may be configured so as to be rewritable by using a communication means or external media.

MODIFIED EXAMPLE 6

The NN circuit 100 may be realized by combining some of the processes in the CNN 200 with a Graphics Processing Unit (GPU) or the like on a cloud server. The NN circuit 100 can realize more complicated processes with fewer resources by performing further cloud-based processes in addition to the processes performed by the edge device in which the NN circuit 100 is provided, or by performing processes on the edge device in addition to the cloud-based processes. With such a configuration, the NN circuit 100 can reduce the amount of communication between the edge device and the cloud by means of processing distribution.

MODIFIED EXAMPLE 7

The operations performed by the NN circuit 100 constituted at least part of the trained CNN 200. However, the operations performed by the NN circuit 100 are not limited thereto. The operations performed by the NN circuit 100 may form at least part of a trained neural network that repeats two types of operations such as, for example, convolution operations and quantization operations.

Additionally, the effects described in the present specification are merely explanatory or exemplary, and are not limiting. In other words, the features in the present disclosure may, in addition to the effects mentioned above or instead of the effects mentioned above, have other effects that would be clear to a person skilled in the art from the descriptions in the present specification.

The present invention can be applied to operations in a neural network.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A neural network circuit comprising:
   a first memory unit that stores input data;
   a convolution operation circuit that performs a convolution operation on a weight and the input data stored in the first memory unit,
   a second memory unit that stores convolution operation output data from the convolution operation circuit; and
   a quantization operation circuit that performs a quantization operation on the convolution operation output data stored in the second memory unit; wherein
   the first memory unit stores a quantization operation output data from the quantization operation circuit:
   the convolution operation circuit performs the convolution operation on the quantization operation output data stored in the first memory unit as the input data; and
   the first memory unit, the convolution operation circuit, the second memory unit, and the convolution operation circuit form a loop,
   wherein:
   the input data is decomposed into a first partial tensor and a second partial tensor; and
   the convolution operation on the first partial tensor in the convolution operation circuit and the quantization operation on the second partial tensor in the quantization operation circuit are performed in parallel.

2. A neural network circuit comprising: as in claim 1,
   a first memory unit that stores input data;
   a convolution operation circuit that performs a convolution operation on a weight and the input data stored in the first memory unit;
   a second memory unit that stores convolution operation output data from the convolution operation circuit; and
   a quantization operation circuit that performs a quantization operation on the convolution operation output data stored in the second memory unit; wherein
   the first memory unit stores a quantization operation output data from the quantization operation circuit:
   the convolution operation circuit performs the convolution operation on the quantization operation output data stored in the first memory unit as the input data; and
   the first memory unit, the convolution operation circuit, the second memory unit, and the convolution operation circuit form a loop,
   wherein:
   the convolution operation circuit performs a layer-(2M−1) convolution operation, where M is a natural number, on the input data stored in the first memory unit, and stores the layer-(2M−−1) convolution operation output data in the second memory unit;
   the quantization operation circuit performs a layer-2M quantization operation on the layer-(2M−1) convolution operation output data stored in the second memory unit, and stores the layer-2M quantization operation output data in the first memory unit; and
   the convolution operation circuit performs a layer-(2M+1) convolution operation with the layer-2M quantization operation output data stored in the first memory unit as the input data, and stores the layer-(2M+1) convolution operation output data in the second memory unit.

3. The neural network circuit as in claim 2, wherein:
   the input data is decomposed into a first partial tensor and a second partial tensor; and
   the layer-(2M+1) convolution operation corresponding to the first partial tensor and the layer-2M quantization operation corresponding to the second partial tensor are performed in parallel.

4. A neural network operation process in which a first memory area and a second memory area are used to perform a convolution operation and a quantization operation, wherein the neural network operation process includes:
   performing a layer-(2M−1) convolution operation, where M is a natural number, on input data stored in the first memory area, and storing the layer-(2M−1) convolution operation output data in the second memory area;
   performing a layer-2M quantization operation on the layer-(2M−1) convolution operation output data stored in the second memory area, and storing the layer-2M quantization operation output data in the first memory area; and
   performing a layer-(2M+1) convolution operation with the layer-2M quantization operation output data stored in the first memory area as the input data, and storing the layer-(2M+1) convolution operation output data in the second memory area.

5. The neural network operation process as in claim 4, wherein:
   the input data is decomposed into a first partial tensor and a second partial tensor; and
   the layer-(2M+1) convolution operation corresponding to the first partial tensor and the layer-2M quantization operation corresponding to the second partial tensor are implemented in parallel.

* * * * *